United States Patent
Pickard et al.

(10) Patent No.: US 9,651,239 B2
(45) Date of Patent: *May 16, 2017

(54) LED LAMP AND HEAT SINK

(71) Applicant: Cree, Inc., Durham, NC (US)

(72) Inventors: Paul Kenneth Pickard, Acton, CA (US); Bart P. Reier, Cary, NC (US); Curt Progl, Raleigh, NC (US); Gerald H. Negley, Chapel Hill, NC (US)

(73) Assignee: Cree, Inc., Durham, NC (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/699,227

(22) Filed: Apr. 29, 2015

(65) Prior Publication Data

US 2015/0241049 A1    Aug. 27, 2015

Related U.S. Application Data

(63) Continuation of application No. 13/803,841, filed on Mar. 14, 2013, now Pat. No. 9,052,093.

(51) Int. Cl.
*F21V 29/77* (2015.01)
*F21V 29/507* (2015.01)
(Continued)

(52) U.S. Cl.
CPC .............. *F21V 29/77* (2015.01); *F21K 9/232* (2016.08); *F21K 9/233* (2016.08); *F21V 29/507* (2015.01);
(Continued)

(58) Field of Classification Search
CPC ........... F21Y 2101/02; F21Y 2105/005; F21V 29/004; F21V 29/2206; F21V 29/2231;
(Continued)

(56) References Cited

U.S. PATENT DOCUMENTS 3,581,162 A    5/1971    Wheatley
5,463,280 A    10/1995    Johnson
(Continued)

FOREIGN PATENT DOCUMENTS

DE    102004042186 A1    3/2006
EP    1058221 A2    12/2000
(Continued)

OTHER PUBLICATIONS

Cree, Inc., International Application No. PCT/US2014/022969, International Search Report and Written Opinion, May 15, 2014.
(Continued)

*Primary Examiner* — Anne Hines
*Assistant Examiner* — Jose M Diaz
(74) *Attorney, Agent, or Firm* — Dennis J. Williamson; Moore & Van Allen PLLC

(57) ABSTRACT

A lamp has an optically transmissive enclosure and a base. At least one LED is located in the enclosure and are operable to emit light when energized through an electrical path from the base. A heat sink comprises a heat dissipating portion having a first part that is located inside of the enclosure and that is thermally coupled to the LED and a second part that is exposed to the ambient environment. The second part comprises a plurality of stems connected to the first part where each stem supports a first overhang that extends over a portion of the enclosure and a second overhang that extends over a portion of the base.

19 Claims, 34 Drawing Sheets

(51) Int. Cl.

| | | |
|---|---|---|
| *F21V 29/74* | (2015.01) | |
| *F21K 9/232* | (2016.01) | |
| *F21K 9/233* | (2016.01) | |
| *F21V 7/00* | (2006.01) | |
| *F21V 29/00* | (2015.01) | |
| *F21Y 101/00* | (2016.01) | |
| *F21Y 115/10* | (2016.01) | |
| *F21Y 107/30* | (2016.01) | |

(52) U.S. Cl.
CPC ............ *F21V 29/74* (2015.01); *F21V 29/773* (2015.01); *F21V 7/0008* (2013.01); *F21V 29/004* (2013.01); *F21Y 2101/00* (2013.01); *F21Y 2107/30* (2016.08); *F21Y 2115/10* (2016.08); *Y02B 20/30* (2013.01)

(58) Field of Classification Search
CPC ...... F21V 7/0008; F21V 15/011; F21K 9/135; F21K 9/137
See application file for complete search history.

(56) References Cited

U.S. PATENT DOCUMENTS

| | | | |
|---|---|---|---|
| 5,561,346 | A | 10/1996 | Byrne |
| 5,585,783 | A | 12/1996 | Hall |
| 5,655,830 | A | 8/1997 | Ruskouski |
| 5,688,042 | A | 11/1997 | Madadi et al. |
| 5,806,965 | A | 9/1998 | Deese |
| 5,947,588 | A | 9/1999 | Huang |
| 5,949,347 | A | 9/1999 | Wu |
| 5,952,916 | A | 9/1999 | Yamabe |
| 6,220,722 | B1 | 4/2001 | Begemann |
| 6,227,679 | B1 | 5/2001 | Zhang et al. |
| 6,234,648 | B1 | 5/2001 | Borner et al. |
| 6,250,774 | B1 | 6/2001 | Begemann et al. |
| 6,276,822 | B1 | 8/2001 | Bedrosian et al. |
| 6,452,217 | B1 | 9/2002 | Wojnarowski et al. |
| 6,465,961 | B1 | 10/2002 | Cao |
| 6,523,978 | B1 | 2/2003 | Huang |
| 6,550,953 | B1 | 4/2003 | Ichikawa et al. |
| 6,634,770 | B2 | 10/2003 | Cao |
| 6,635,987 | B1 | 10/2003 | Wojnarowski et al. |
| 6,659,632 | B2 | 12/2003 | Chen |
| 6,709,132 | B2 | 3/2004 | Ishibashi |
| 6,746,885 | B2 | 6/2004 | Cao |
| 6,803,607 | B1 | 10/2004 | Chan et al. |
| 6,848,819 | B1 | 2/2005 | Arndt et al. |
| 6,864,513 | B2 | 3/2005 | Lin et al. |
| 6,948,829 | B2 | 9/2005 | Verdes et al. |
| 6,982,518 | B2 | 1/2006 | Chou et al. |
| 7,048,412 | B2 | 5/2006 | Martin et al. |
| 7,080,924 | B2 | 7/2006 | Tseng et al. |
| 7,086,756 | B2 | 8/2006 | Maxik |
| 7,086,767 | B2 | 8/2006 | Sidwell et al. |
| 7,144,135 | B2 | 12/2006 | Martin et al. |
| 7,165,866 | B2 | 1/2007 | Li |
| 7,172,314 | B2 | 2/2007 | Currie et al. |
| 7,213,940 | B1 | 5/2007 | Van De Ven et al. |
| 7,354,174 | B1 | 4/2008 | Yan |
| 7,396,142 | B2 | 7/2008 | Laizure, Jr. et al. |
| 7,600,882 | B1 | 10/2009 | Morejon et al. |
| 7,726,836 | B2 | 6/2010 | Chen |
| 7,824,065 | B2 | 11/2010 | Maxik |
| 8,021,025 | B2 | 9/2011 | Lee |
| 8,253,316 | B2 | 8/2012 | Sun et al. |
| 8,272,762 | B2 | 9/2012 | Maxik et al. |
| 8,274,241 | B2 | 9/2012 | Guest et al. |
| 8,277,082 | B2 | 10/2012 | Dassanayake et al. |
| 8,282,250 | B1 | 10/2012 | Dassanayake et al. |
| 8,292,468 | B2 | 10/2012 | Narendran et al. |
| 8,322,896 | B2 | 12/2012 | Falicoff et al. |
| 8,371,722 | B2 | 2/2013 | Carroll |
| 8,400,051 | B2 | 3/2013 | Hakata et al. |
| 8,415,865 | B2 | 4/2013 | Liang et al. |
| 8,421,320 | B2 | 4/2013 | Chuang |
| 8,421,321 | B2 | 4/2013 | Chuang |
| 8,421,322 | B2 | 4/2013 | Carroll et al. |
| 8,449,154 | B2 | 5/2013 | Uemoto et al. |
| 8,502,468 | B2 | 8/2013 | Li et al. |
| 8,641,237 | B2 | 2/2014 | Chuang |
| 8,653,723 | B2 | 2/2014 | Cao et al. |
| 8,696,168 | B2 | 4/2014 | Li et al. |
| 8,740,415 | B2 | 6/2014 | Wheelock |
| 8,750,671 | B1 | 6/2014 | Kelly et al. |
| 8,752,984 | B2 | 6/2014 | Lenk et al. |
| 8,760,042 | B2 | 6/2014 | Sakai et al. |
| 2003/0214810 | A1 | 11/2003 | Zhang |
| 2004/0201990 | A1 | 10/2004 | Meyer |
| 2005/0254264 | A1 | 11/2005 | Sidwell et al. |
| 2006/0198147 | A1 | 9/2006 | Ge |
| 2009/0184618 | A1 | 7/2009 | Hakata et al. |
| 2012/0002423 | A1 | 1/2012 | Li et al. |
| 2012/0014107 | A1 | 1/2012 | Avila |
| 2012/0040585 | A1 | 2/2012 | Huang |
| 2012/0075854 | A1 | 3/2012 | Maxik et al. |
| 2013/0021794 | A1 | 1/2013 | Chinniah et al. |
| 2013/0039064 | A1 | 2/2013 | Lui |

FOREIGN PATENT DOCUMENTS

| | | |
|---|---|---|
| EP | 0890059 B1 | 6/2004 |
| EP | 1471564 A2 | 10/2004 |
| EP | 2180233 A1 | 4/2010 |
| EP | 2236907 A2 | 2/2012 |
| EP | 2413029 A2 | 2/2012 |
| EP | 2416056 A2 | 2/2012 |
| GB | 2345954 A | 7/2000 |
| GB | 2366610 A | 3/2002 |
| GB | 2453718 A | 4/2009 |
| JP | H09265807 A | 10/1997 |
| JP | 11111819 A | 4/1999 |
| JP | 2000173304 A | 6/2000 |
| JP | 2001118403 A | 4/2001 |
| TW | M412319 U | 9/2011 |
| WO | 0124583 A1 | 4/2001 |
| WO | 0160119 A2 | 8/2001 |
| WO | 2004100265 A2 | 11/2004 |
| WO | 2005078338 A1 | 8/2005 |
| WO | 2011098358 A1 | 8/2011 |
| WO | 2012011279 A1 | 1/2012 |
| WO | 2012031533 A1 | 3/2012 |

OTHER PUBLICATIONS

Panasonic, Screw Type 4W LED Bulb Equivalent to 20W, http://www.panasonic.co.uk/html/en_GB/Products/Lighitng/LED+Lamps/LDAHV4L27CG/Overview/7848548/index.html.
U.S. Appl. No. 13/340,928, filed Dec. 30, 2011.
U.S. Appl. No. 13/462,388, filed May 2, 2012.
U.S. Appl. No. 13/662,618, filed Oct. 29, 2012.
U.S. Appl. No. 13/467,670, filed May 9, 2012.
U.S. Appl. No. 13/446,759, filed Apr. 13, 2012.
U.S. Appl. No. 61/738,668, filed Dec. 18, 2012.
U.S. Appl. No. 61/712,585, filed Oct. 11, 2012.
U.S. Appl. No. 61/716,818, filed Oct. 22, 2012.
U.S. Appl. No. 61/670,686, filed Jul. 12, 2012.
U.S. Appl. No. 13/758,565, filed Feb. 4, 2013.
U.S. Appl. No. 12/775,842, filed May 7, 2010.
U.S. Appl. No. 13/192,755, filed Jul. 28, 2011.
U.S. Appl. No. 13/339,974, filed Dec. 29, 2011.
U.S. Appl. No. 13/235,103, filed Sep. 16, 2011.
U.S. Appl. No. 13/360,145, filed Jan. 27, 2012.
U.S. Appl. No. 13/338,095, filed Dec. 27, 2011.
U.S. Appl. No. 13/338,076, filed Dec. 27, 2011.
U.S. Appl. No. 13/405,891, filed Feb. 27, 2012.
U.S. Appl. No. 13/781,847, filed Mar. 1, 2013.
U.S. Appl. No. 13/774,193, filed Feb. 22, 2013.
U.S. Appl. No. 13/781,844, filed Mar. 1, 2013.
U.S. Appl. No. 13/657,421, filed Oct. 22, 2012.
U.S. Appl. No. 13/341,337, filed Dec. 30, 2011.

(56) References Cited

OTHER PUBLICATIONS

Cree, Inc., International Application No. PCT/US2013/035400 Invitation to Pay Additional Fees, and, Where Applicable, Protest Fee, Jun. 5, 2013.
Cree, Inc., International Application No. PCT/US2013/035403 International Search Report and Written Opinion, May 29, 2013.
U.S. Appl. No. 14/010,868, filed Aug. 27, 2013.
U.S. Appl. No. 13/783,700, filed Mar. 4, 2013.
Cree, Inc., International Application No. PCT/US2013/028174, International Search Report and Written Opinion, May 8, 2013.
Cree, Inc., International Application No. PCT/US2013/035400, International Search Report and Written Opinion, Sep. 17, 2013.

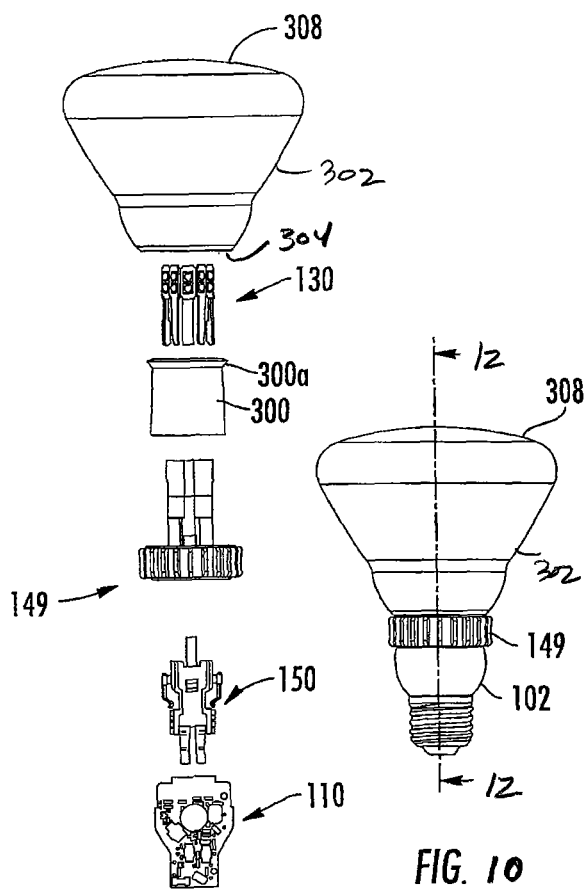
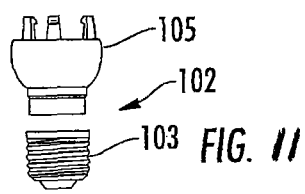
FIG. 11

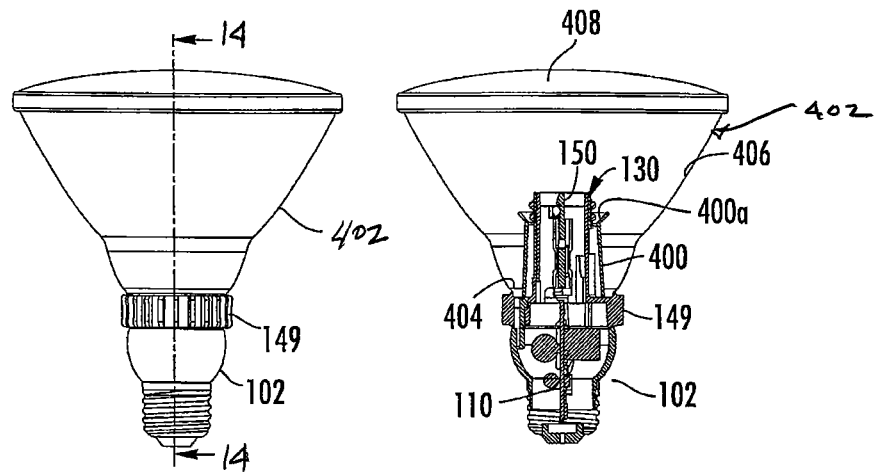
FIG. 13　　　FIG. 14
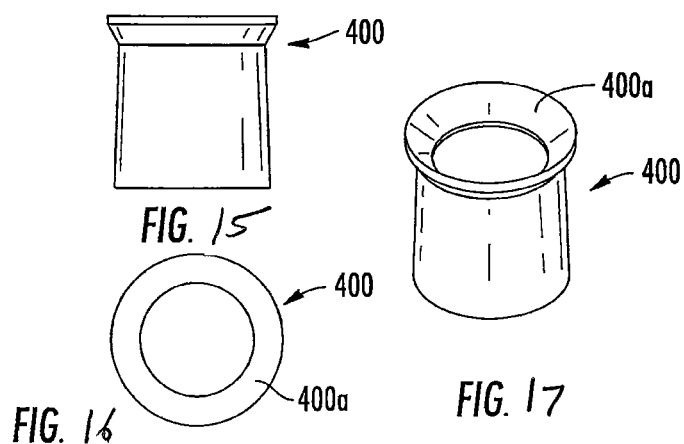
FIG. 15
FIG. 16　　　FIG. 17

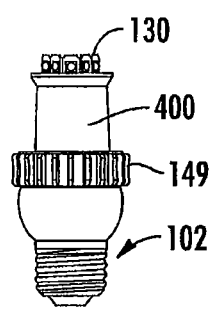
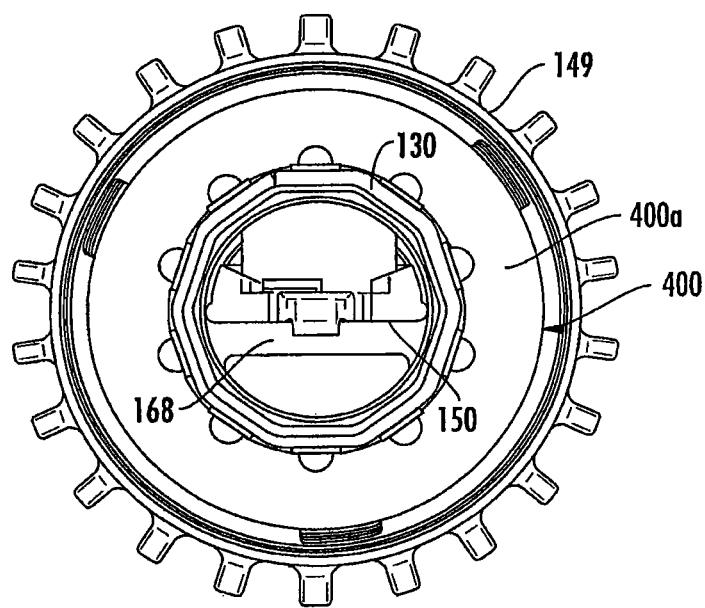
FIG. 18
FIG. 19

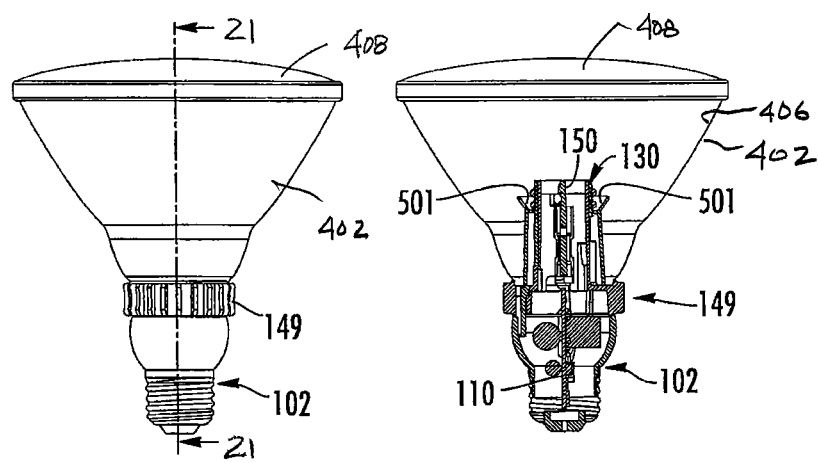
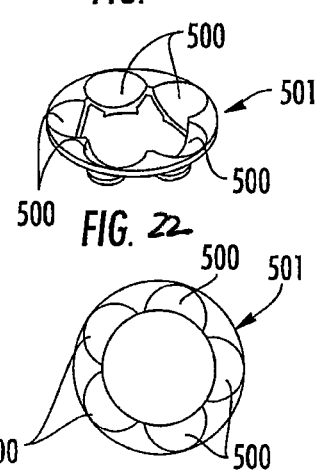
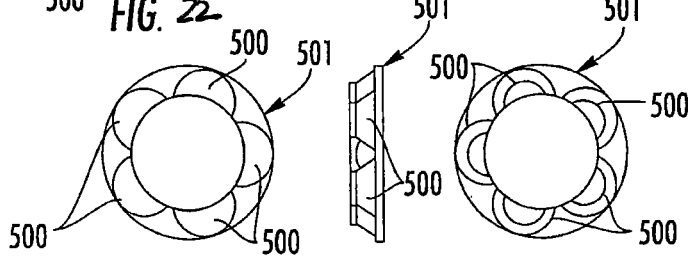
FIG. 20    FIG. 21
FIG. 22
FIG. 23    FIG. 24    FIG. 25

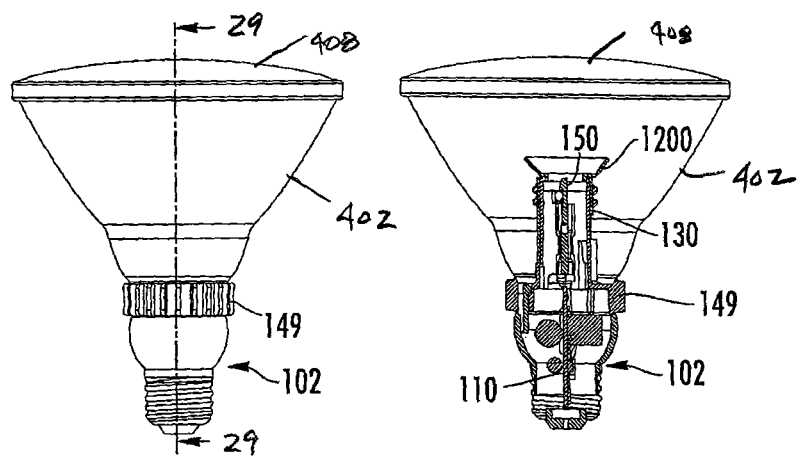
FIG. 28  FIG. 29
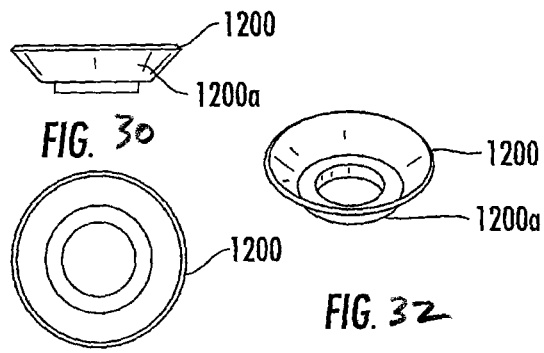
FIG. 30
FIG. 31
FIG. 32

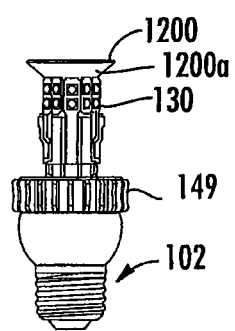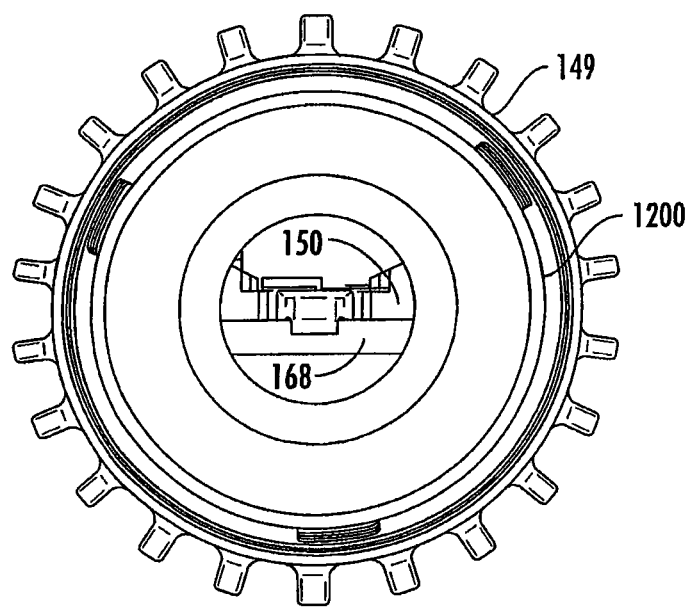
FIG. 33
FIG. 34

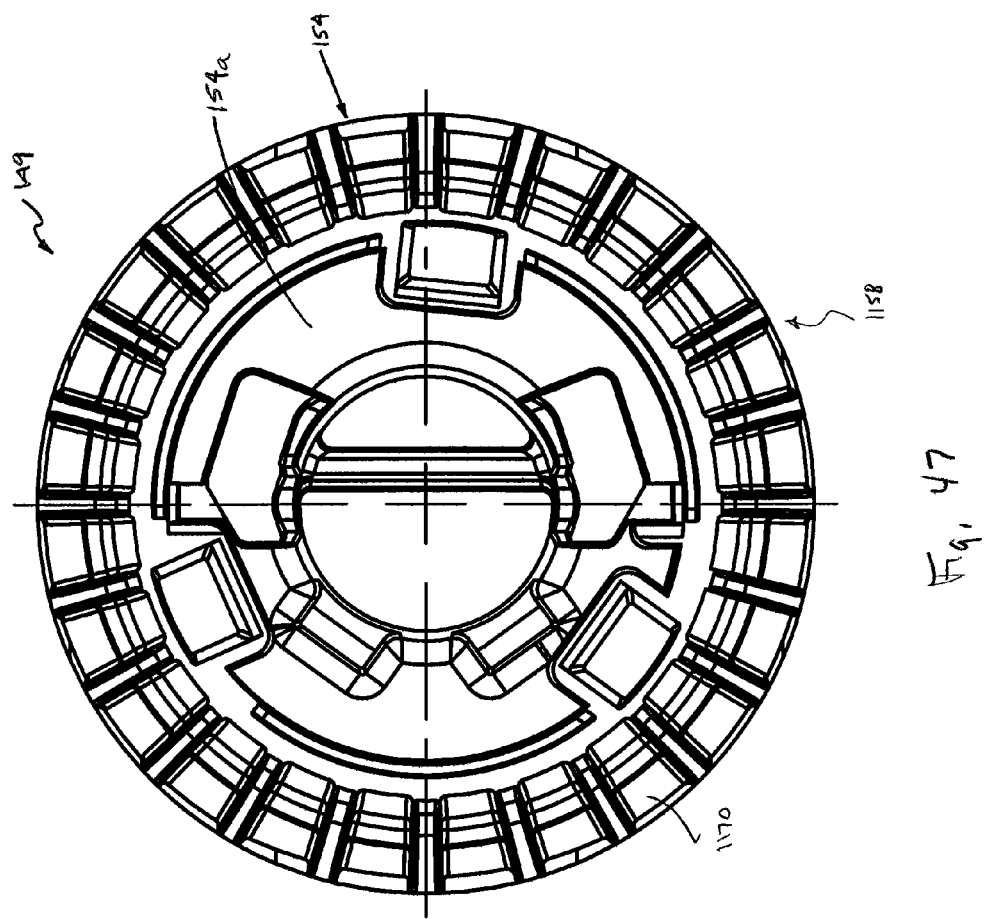

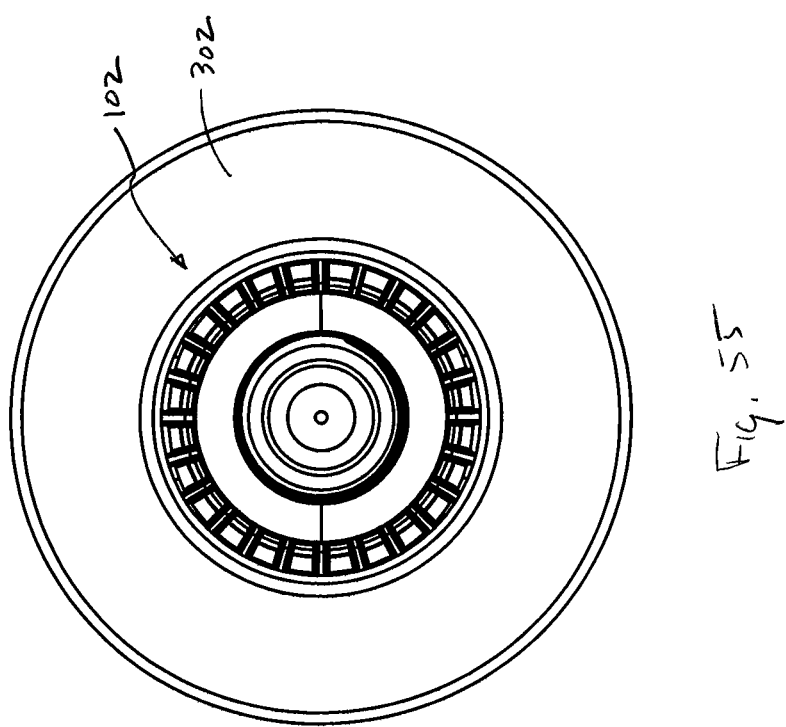

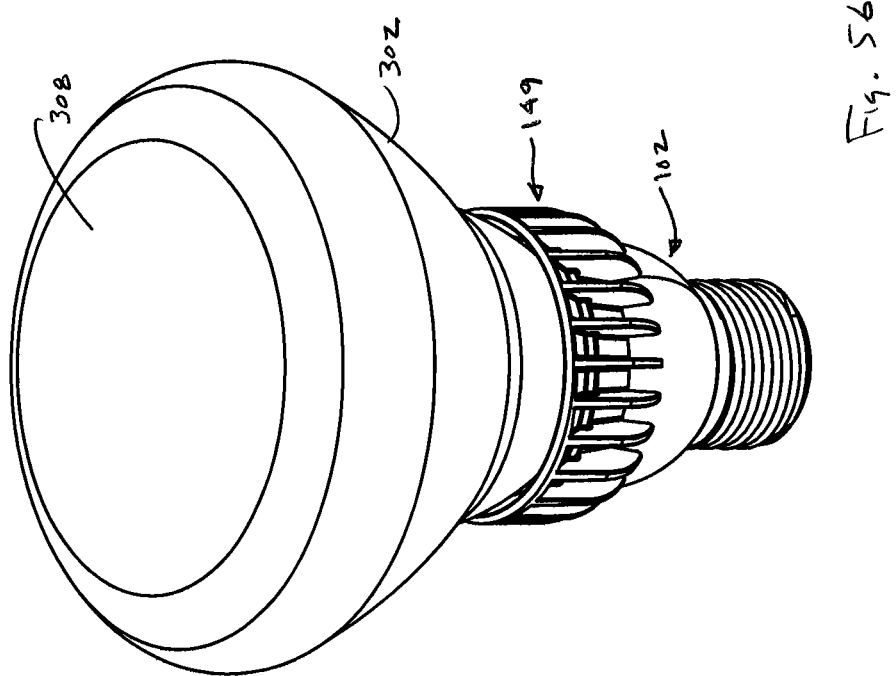

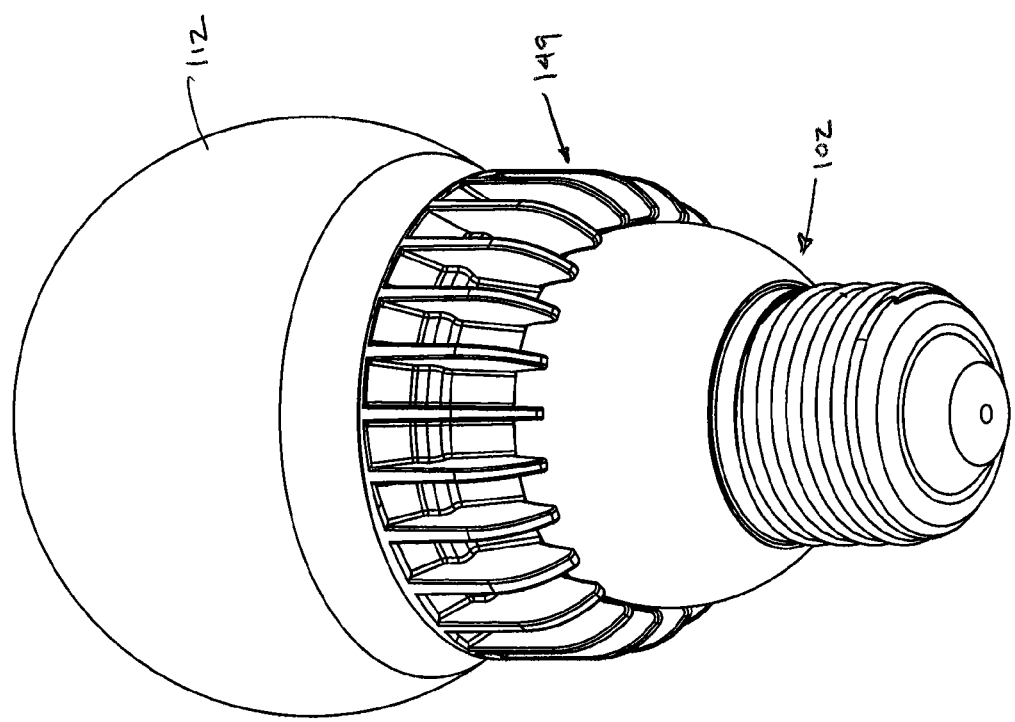

LED LAMP AND HEAT SINK

This application is a continuation application of U.S. patent application Ser. No. 13/803,841, filed Mar. 14, 2013, now U.S. Pat. No. 9,052,093, the contents of which are incorporated herein by reference.

BACKGROUND

Light emitting diode (LED) lighting systems are becoming more prevalent as replacements for legacy lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver virtually any color light, and generally contain no lead or mercury. A solid-state lighting system may take the form of a luminaire, lighting unit, light fixture, light bulb, or a "lam" p.

An LED lighting system may include, for example, a packaged light emitting device including one or more light emitting diodes (LEDs), which may include inorganic LEDs, which may include semiconductor layers forming p-n junctions and/or organic LEDs (OLEDs), which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a standard incandescent bulb, or any of various types of fluorescent lamps. LED lamps often include some type of optical element or elements to allow for localized mixing of colors, collimate light, or provide a particular light pattern. Sometimes the optical element also serves as an envelope or enclosure for the electronics and or the LEDs in the lamp.

Since, ideally, an LED lamp designed as a replacement for a traditional incandescent or fluorescent light source needs to be self-contained; a power supply is included in the lamp structure along with the LEDs or LED packages and the optical components. A heatsink is also often needed to cool the LEDs and/or power supply in order to maintain appropriate operating temperature.

SUMMARY OF THE INVENTION

In some embodiments, a lamp comprises an optically transmissive enclosure and a base. An LED is located in the enclosure and is operable to emit light when energized through an electrical path from the base. A heat sink comprises a heat dissipating portion that is at least partially exposed to the ambient environment and comprises a plurality of fins. The plurality of fins extend to the exterior of the lamp and each of the plurality of fins comprises an overhang that extends over at least one of the base and the enclosure.

The lamp may be one of an omnidirectional lamp and a directional lamp. The heat sink may comprise a heat conducting portion that is located in the enclosure and that is thermally coupled to the heat dissipating portion. The plurality of fins may comprise a first overhang that extends over the enclosure and a second overhang that extends over the base. The plurality of fins may extend generally radially from a body of the heat sink. The overhang may extend along the longitudinal axis of the lamp. Each of the plurality of fins may comprise a stem that extends from a body of the heat dissipating portion and supports the overhang. The stem may extend between the enclosure and the base. The overhang may extend approximately 5 mm beyond the stem. The ends of the overhang on each of the plurality of fins may be connected to a flange that reflects light emitted from the enclosure and redistributes the emitted light from the area adjacent the base. The ends of the overhang on each of the plurality of fins may be free and unsupported. The overhang may conform to the shape of the enclosure and/or base. The overhang may reflect light toward a distal end of the enclosure. The overhang may cover a connection between the enclosure and the heat sink. The overhang may cover a connection between the base and the heat sink. The heat sink may extend between the enclosure and the base.

In some embodiments, a lamp comprises an optically transmissive enclosure and a base. An LED is located in the enclosure and are operable to emit light when energized through an electrical path from the base. A heat sink comprises a heat dissipating portion having a first part that is located inside of the enclosure and that is thermally coupled to the LED and a second part that is exposed to the ambient environment. The second part comprises a first overhang that extends over a portion of the enclosure and a second overhang that extends over a portion of the base.

The first overhang and the second overhang may be connected to a stem that extends from the first part of the heat dissipating portion. A portion of the heat sink may be disposed between the enclosure and the base.

In some embodiments, a lamp comprises an optically transmissive enclosure and a base that together form a lamp housing. A gap is formed in the lamp housing that has a width. An LED is located in the enclosure and operable to emit light when energized through an electrical path from the base. A heat sink comprises a heat dissipating portion that is at least partially disposed in the lamp housing and that extends through the gap in the lap housing. The heat dissipating portion comprises a plurality of fins having a length that is wider than the width of the gap.

BRIEF DESCRIPTION OF THE DRAWINGS

FIG. 10 is a plan view of an alternate embodiment of the lamp of the invention.

FIG. 11 is an exploded plan view of the lamp of FIG. 10.

FIG. 13 is a front view of an alternate embodiment of the lamp of the invention.

FIG. 14 is a section view taken along line 14-14 of FIG. 13.

FIG. 15 is a side view of an embodiment of a reflector.

FIG. 16 is a top view of the reflector of FIG. 15.

FIG. 17 is a perspective view of the reflector of FIG. 15.

FIG. 18 is a side view of the assembly of FIG. 13.

FIG. 19 is a top view showing the reflector and LED assembly and heat sink of the embodiment of FIG. 13.

FIG. 20 is a front view of an alternate embodiment of the lamp of the invention.

FIG. 21 is a section view taken along line 21-21 of FIG. 20.

FIG. 22 is a perspective view of an embodiment of a reflector.

FIG. 23 is a top view of the reflector of FIG. 22.

FIG. 24 is a side view of the reflector of FIG. 22.

FIG. 25 is a bottom view of the reflector of FIG. 22.

FIG. 28 is a front view of an alternate embodiment of the lamp of the invention.

FIG. 29 is a section view taken along line 29-29 of FIG. 28.

FIG. 30 is a side view of an embodiment of a reflector.

FIG. 31 is a top view of the reflector of FIG. 30.

FIG. 32 is a perspective view of the reflector of FIG. 30.

FIG. 33 is a side view of the assembly of FIG. 29.

FIG. 34 is a top view showing the reflector and LED assembly and heat sink of the embodiment of FIG. 29.

FIG. 47 is a bottom view of the embodiment of the heat sink of FIG. 42.

FIG. 55 is a bottom view of the embodiment of the lamp of FIG. 50.

FIG. 56 is a top perspective view of the embodiment of the lamp of FIG. 50.

FIG. 57 is a bottom perspective view of the embodiment of the lamp of FIG. 50.

FIG. 65 is a bottom perspective view of the embodiment of the lamp of FIG. 58.

DETAILED DESCRIPTION

Figure 2:
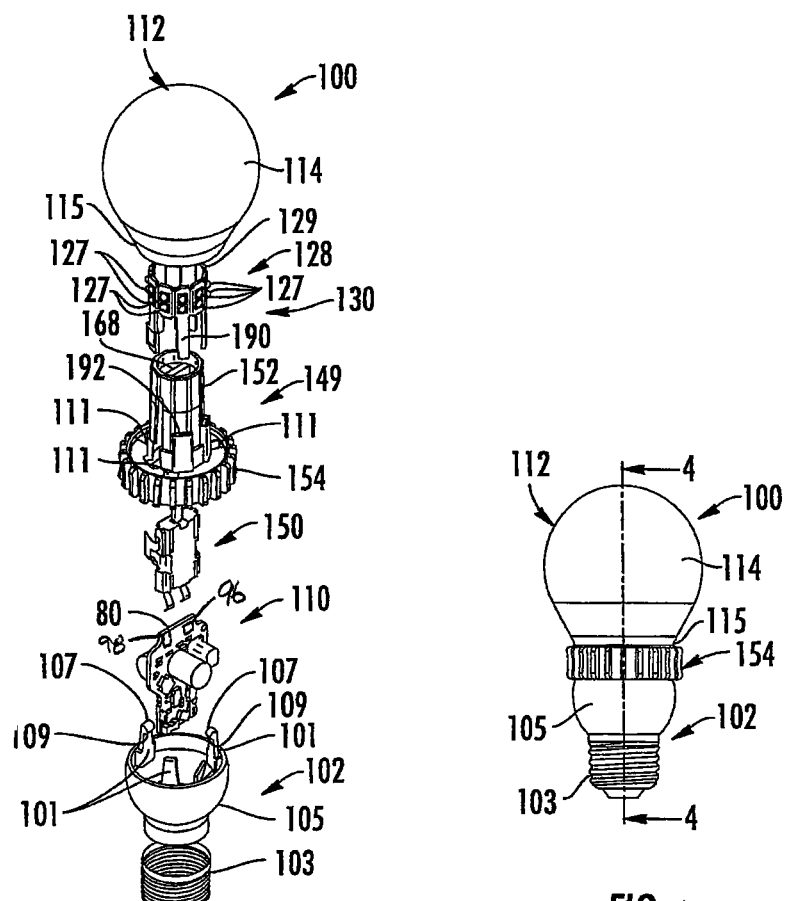
FIG. 2 is an exploded perspective view of the lamp of FIG. 1.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Embodiments of the present invention provide a solid-state lamp with centralized light emitters, more specifically, LEDs. Multiple LEDs can be used together, forming an LED array. The LEDs can be mounted on or fixed within the lamp in various ways. In at least some example embodiments, a submount is used. The LEDs are disposed at or near the central portion of the structural envelope of the lamp. Since the LED array may be configured in some embodiments to reside centrally within the structural envelope of the lamp, a lamp can be constructed so that the light pattern is not adversely affected by the presence of a heat sink and/or mounting hardware, or by having to locate the LEDs close to the base of the lamp. It should also be noted that the term "lamp" is meant to encompass not only a solid-state replacement for a traditional incandescent bulb as illustrated herein, but also replacements for fluorescent bulbs, replacements for complete fixtures, and any type of light fixture that may be custom designed as a solid state fixture for mounting on walls, in or on ceilings, on posts, and/or on vehicles.

FIGS. 1 through 4 show a lamp, 100, according to some embodiments of the present invention. Lamp 100 may be used as an A-series lamp with an Edison base 102, more particularly; lamp 100 is designed to serve as a solid-state replacement for an A19 incandescent bulb. The LEDs 127 of LED array 128 are mounted on a submount 129. In the present invention the term "submount" is used to refer to the support structure that supports the individual LEDs or LED packages and in one embodiment comprises a printed circuit board or "PCB" although it may comprise other structures such as a lead frame extrusion or the like or combinations of such structures. While a lamp having the size and form factor of a standard-sized household incandescent bulb is shown in FIGS. 1-4, the lamp may have other the sizes and form factors. For example, the lamp may be a PAR-style lamp such as a replacement for a PAR-38 incandescent bulb as shown in FIG. 14 or a replacement for a BR-style incandescent bulb as shown in FIG. 10.

Enclosure 112 is, in some embodiments, made of glass, quartz, borosilicate, silicate, polycarbonate, other plastic or other suitable material. The enclosure may be of similar shape to that commonly used in household incandescent bulbs. In some embodiments, the glass enclosure is coated on the inside with silica, providing a diffuse scattering layer that produces a more uniform far field pattern. The enclosure may also be etched, frosted or coated. Alternatively, the surface treatment may be omitted and a clear enclosure may be provided. The enclosure may also be provided with a shatter proof or shatter resistant coating. It should also be noted that in this or any of the embodiments shown here, the optically transmissive enclosure or a portion of the optically transmissive enclosure could be coated or impregnated with phosphor or a diffuser. The enclosure 112 may have a traditional bulb shape having a globe shaped main body 114 that tapers to a narrower neck 115.

A lamp base 102 such as an Edison base functions as the electrical connector to connect the lamp 100 to an electrical socket or other connector. Depending on the embodiment, other base configurations are possible to make the electrical connection such as other standard bases or non-traditional bases.

In some embodiments, a driver and/or power supply are included with the LED array 128 on the submount 129. In other embodiments the driver and/or power supply 110 are included in the base 102 as shown. The power supply and drivers may also be mounted separately where components of the power supply are mounted in the base 102 and the driver is mounted with the submount 129 in the enclosure 112. Base 102 may include a power supply or driver and form all or a portion of the electrical path between the mains and the LEDs 127. The base 102 may also include only part of the power supply circuitry while some smaller components reside on the submount 129. In some embodiments any component that goes directly across the AC input line may be in the base 102 and other components that assist in converting the AC to useful DC may be in the enclosure 112. In one example embodiment, the inductors and capacitor that form part of the EMI filter are in the Edison base. Suitable power supplies and drivers are described in U.S. patent application Ser. No. 13/462,388 filed on May 2, 2012 and titled "Driver Circuits for Dimmable Solid State Lighting Apparatus" which is incorporated herein by reference in its entirety; U.S. patent application Ser. No. 12/775,842 filed on May 7, 2010 and titled "AC Driven Solid State Lighting Apparatus with LED String Including Switched Segments" which is incorporated herein by reference in its entirety; U.S. patent application Ser. No. 13/192,755 filed Jul. 28, 2011 titled "Solid State Lighting Apparatus and Methods of Using Integrated Driver Circuitry" which is incorporated herein by reference in its entirety; U.S. patent application Ser. No. 13/339,974 filed Dec. 29, 2011 titled "Solid-State Lighting Apparatus and Methods Using Parallel-Connected Segment Bypass Circuits" which is incorporated herein by reference in its entirety; U.S. patent application Ser. No. 13/235,103 filed Sep. 16, 2011 titled "Solid-State Lighting Apparatus and Methods Using Energy Storage" which is incorporated herein by reference in its entirety; U.S. patent application Ser. No. 13/360,145 filed Jan. 27, 2012 titled "Solid State Lighting Apparatus and Methods of Forming" which is incorporated herein by reference in its entirety; U.S. patent application Ser. No. 13/338,095 filed Dec. 27, 2011 titled "Solid-State Lighting Apparatus Including an Energy Storage Module for Applying Power to a Light Source Element During Low Power Intervals and Methods of Operating the Same" which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component" which is incorporated herein by reference in its entirety; and U.S. patent application Ser. No. 13/405,891 filed Feb. 27, 2012 titled "Solid-State Lighting Apparatus and Methods Using Energy Storage" which is incorporated herein by reference in its entirety.

The AC to DC conversion may be provided by a boost topology to minimize losses and therefore maximize conversion efficiency. The boost supply is connected to high voltage LEDs operating at greater than 200V. Other embodiments are possible using different driver configurations, or a boost supply at lower voltages.

Figure 1:
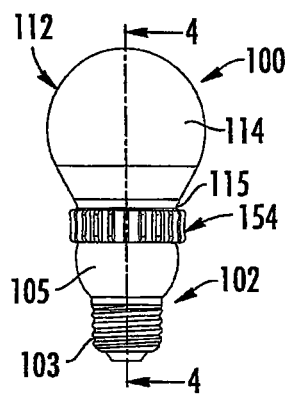
FIG. 1 is a plan view of an embodiment of a lamp of the invention.
Figure 3:
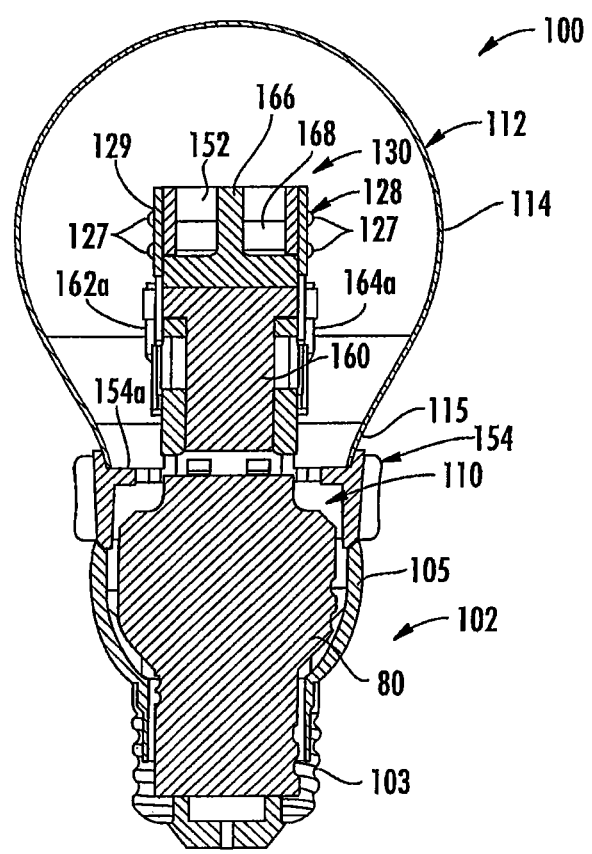
FIG. 3 is a section view taken along a line 90 degrees to line 4-4.

With the embodiment of FIG. 1, as with many other embodiments of the invention, the term "electrical path" can be used to refer to the entire electrical path to the LED array 128, including an intervening power supply disposed between the electrical connection that would otherwise provide power directly to the LEDs and the LED array, or it may be used to refer to the connection between the mains and all the electronics in the lamp, including the power supply. The term may also be used to refer to the connection between the power supply and the LED array. Electrical conductors run between the LED assembly 130 and the lamp base 102 to carry both sides of the supply to provide critical current to the LEDs 127 as will be described.

The LED assembly 130 may be implemented using a printed circuit board ("PCB") and may be referred by in some cases as an LED PCB. In some embodiments the LED PCB comprises the submount 129. The lamp 100 comprises a solid-state lamp comprising a LED assembly 130 with light emitting LEDs 127. Multiple LEDs 127 can be used together, forming the LED array 128. The LEDs 127 can be mounted on or fixed within the lamp in various ways. In at least some example embodiments, submount 129 is used. In one embodiment, the LED assembly 130 has a maximum outer dimension that fits into the open neck 115 of the enclosure 112 during the manufacturing process and an internal dimension that is at least as wide as the width or diameter of the heat conducting portion 152 of heat sink 149.

The LEDs 127 in the LED array 128 include LEDs which may comprise an LED die disposed in an encapsulant such as silicone, and LEDs which may be encapsulated with a phosphor to provide local wavelength conversion, as will be described later when various options for creating white light are discussed. A wide variety of LEDs and combinations of LEDs may be used in the LED assembly 130 as described herein. The LEDs 127 of the LED array 128 are operable to emit light when energized through the electrical path.

In some embodiments a gas movement device (not shown) may be provided within the enclosure 112 to increase the heat transfer between the LEDs 127 and LED assembly 130 and heat sink 149. The movement of the gas over the LED assembly 130 moves the gas boundary layer on the components of the LED assembly 130. In some embodiments the gas movement device comprises a small fan. The fan may be connected to the power source that powers the LEDs 127. While the gas movement device may comprise an electric fan, the gas movement device may comprise a wide variety of apparatuses and techniques to move air inside the enclosure such as a rotary fan, a piezoelectric fan, corona or ion wind generator, synjet diaphragm pumps or the like.

The LED assembly 130 comprises a submount 129 arranged such that the LED array 128 is substantially in the center of the enclosure 112 such that the LED's 127 are positioned at the approximate center of enclosure 112. As used herein the terms "center of the enclosure" and "optical center of the enclosure" refers to the vertical position of the LEDs in the enclosure as being aligned with the approximate largest diameter area of the globe shaped main body 114. "Vertical" as used herein means along the longitudinal axis of the bulb where the longitudinal axis extends from the base to the free end of the bulb as represented for example by line 4-4 in FIG. 1. In one embodiment, the LED array 128 is arranged in the approximate location that the visible glowing filament is disposed in a standard incandescent bulb. The terms "center of the enclosure" and "optical center of the enclosure" do not necessarily mean the exact center of the enclosure and are used to signify that the LEDs are located along the longitudinal axis of the lamp at a position between the ends of the enclosure near a central portion of the enclosure.

Figure 8:
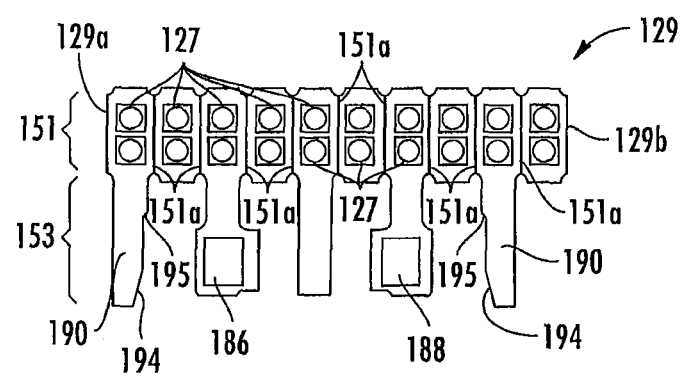
FIG. 8 is a side view of an embodiment of a MCPCB submount usable in embodiments of the lamp of the invention.
Figure 9:
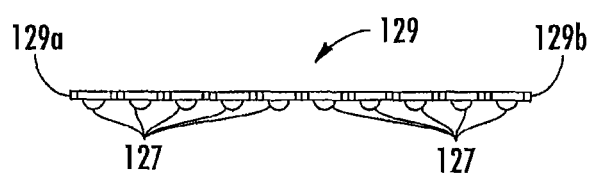
FIG. 9 is an end view of the embodiment of the MCPCB submount of FIG. 8.
Figure 12:
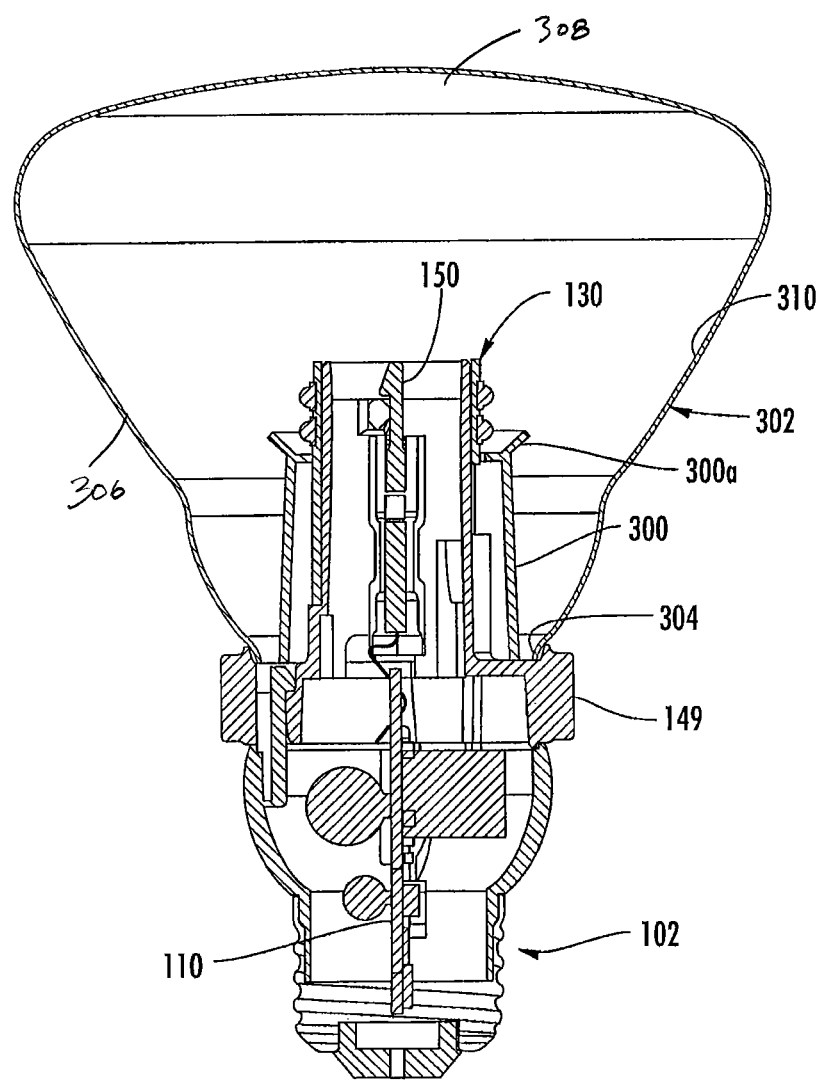
FIG. 12 is a section view taken along line 12-12 of FIG. 10.
Figure 26:
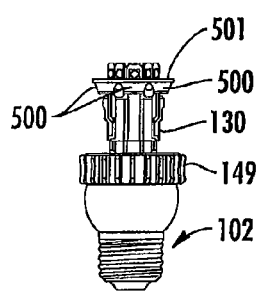
FIG. 26 is a side view of the assembly of FIG. 21.
Figure 27:
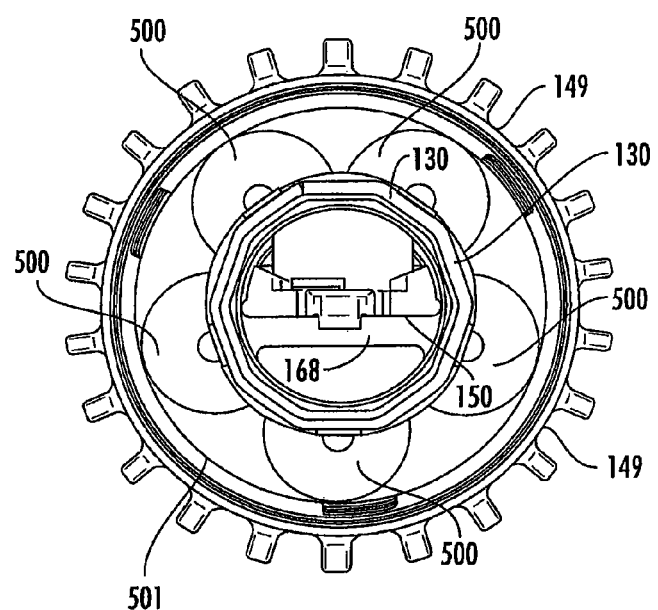
FIG. 27 is a top view showing the reflector and LED assembly and heat sink of the embodiment of FIG. 21.
Figure 35:
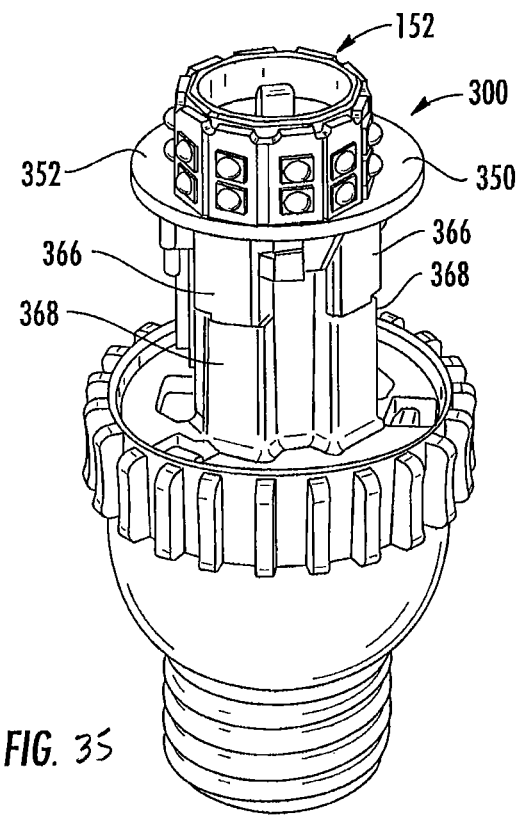
FIG. 35 is a perspective view of an embodiment of a reflector, heat sink and base.
Figure 36:
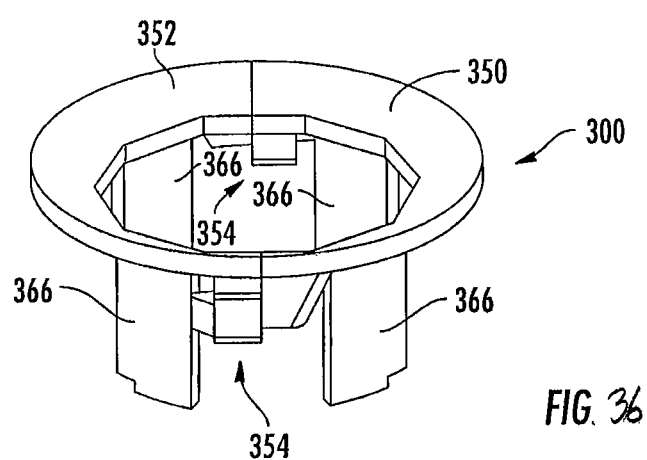
FIG. 36 is a perspective view of one embodiment of the reflector of FIG. 35.
Figures 37, 38:
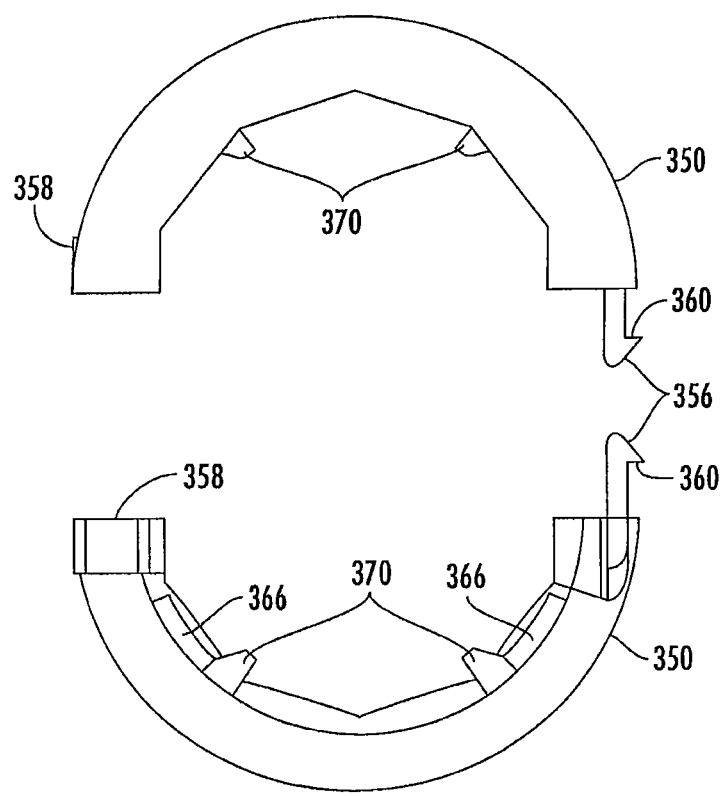
FIG. 37 is a top view of one portion of the reflector of FIG. 36.
FIG. 38 is a bottom view of one portion of the reflector of FIG. 36.

Referring to FIGS. 8 and 9, in some embodiments, the submount 129 may comprise a PCB, metal core board, metal core printed circuit board or other similar structure. The submount may be made of a thermally conductive material. The entire area of the submount 129 may be thermally conductive such that the entire LED assembly 130 transfers heat to the heat sink 149. The submount 129 comprises a first LED mounting portion 151 that functions to mechanically and electrically support the LEDs 127 and a second connector portion 153 that functions to provide thermal, electrical and mechanical connections to the LEDs 127 as shown in FIG. 8. The submount 129 may be bent into the configuration of the LED assembly 130 as shown in the figures.

In one embodiment, the enclosure and base are dimensioned to be a replacement for an ANSI standard A19 bulb such that the dimensions of the lamp 100 fall within the ANSI standards for an A19 bulb. The dimensions may be different for other ANSI standards including, but not limited to, A21 and A23 standards. While specific reference has been made with respect to an A-series lamp with an Edison base 102 the structure and assembly method may be used on other lamps such as a PAR-style lamp such as a replacement for a PAR-38 incandescent bulb or a BR-style lamp. In other embodiments, the LED lamp can have any shape, including standard and non-standard shapes.

In some embodiments, the LED lamp 100 is equivalent to a 60 Watt incandescent light bulb. In one embodiment of a 60 Watt equivalent LED bulb, the LED assembly 130 comprises an LED array 128 of 20 XLamp® XT-E High Voltage white LEDs manufactured by Cree, Inc., where each XLamp® XT-E LED has a 46 V forward voltage and includes 16 DA LED chips manufactured by Cree, Inc. and configured in series. The XLamp® XT-E LEDs may be configured in four parallel strings with each string having five LEDs arranged in series, for a total of greater than 200 volts, e.g. about 230 volts, across the LED array 128. In another embodiment of a 60 Watt equivalent LED bulb, 20 XLamp® XT-E LEDs are used where each XT-E has a 12 V forward voltage and includes 16 DA LED chips arranged in four parallel strings of four DA chips arranged in series, for a total of about 240 volts across the LED array 128 in this embodiment. In some embodiments, the LED lamp 100 is equivalent to a 40 Watt incandescent light bulb. In such embodiments, the LED array 128 may comprise 10 XLamp® XT-E LEDs where each XT-E includes 16 DA LED chips configured in series. The 10 46V XLamp® XT-E® LEDs may be configured in two parallel strings where each string has five LEDs arranged in series, for a total of about 230 volts across the LED array 128. In other embodiments, different types of LEDs are possible, such as XLamp® XB-D LEDs manufactured by Cree, Inc. or others. Other arrangements of chip on board LEDs and LED packages may be used to provide LED based light equivalent to 40, 60 and/or greater other watt incandescent light bulbs, at about the same or different voltages across the LED array 128.

The base 102 comprises an electrically conductive Edison screw 103 for connecting to an Edison socket and a housing portion 105 connected to the Edison screw. The Edison screw 103 may be connected to the housing portion 105 by adhesive, mechanical connector, welding, separate fasteners or the like. The housing portion 105 may comprise an electrically insulating material such as plastic. Further, the material of the housing portion 105 may comprise a thermally conductive material such that the housing portion 105 may form part of the heat sink structure for dissipating heat from the lamp 100. The housing portion 105 and the Edison screw 103 define an internal cavity for receiving the electronics 110 of the lamp including the power supply and/or drivers or a portion of the electronics for the lamp. The lamp electronics 110 are electrically coupled to the Edison screw 103 such that the electrical connection may be made from the Edison screw 103 to the lamp electronics 110. The base 102 may be potted to physically and electrically isolate and protect the lamp electronics 110. The lamp electronics 110 include a first contact pad 96 and a second contact pad 98 that allow the lamp electronics 110 to be electrically coupled to the LED assembly 130 in the lamp as will hereinafter be described. Contact pads 96 and 98 may be formed on printed circuit board 80 which includes the power supply, including large capacitor and EMI components that are across the input AC line along with the driver circuitry as described herein.

Figure 5:
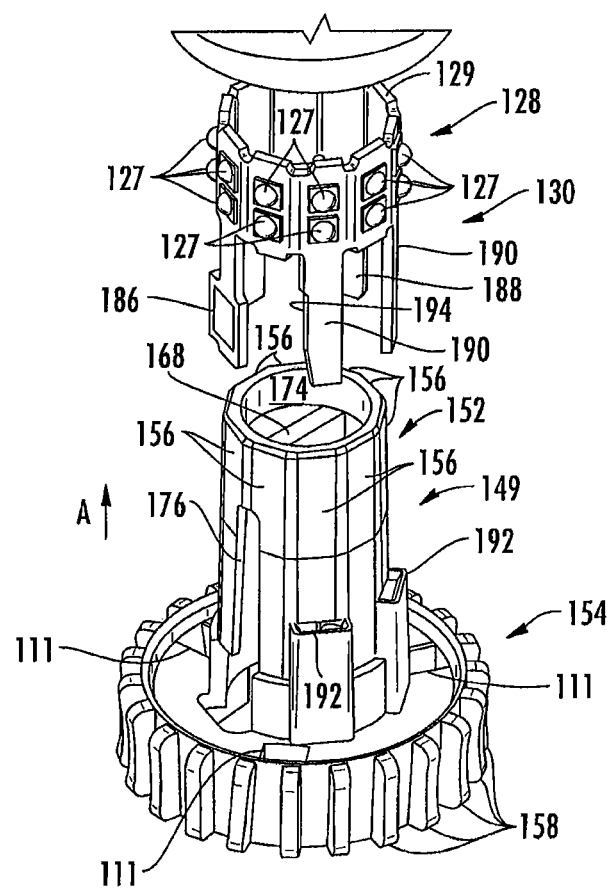
FIG. 5 is an exploded view showing an embodiment of the heat sink and LED assembly of FIG. 1.

In some embodiments, the submount 129 of the LED assembly 130 may comprise a lead frame made of an electrically conductive material such as copper, copper alloy, aluminum, steel, gold, silver, alloys of such metals, thermally conductive plastic or the like. In other embodiments, the submount comprises a PCB such as a metal core PCB (MCPCB) as shown in FIGS. 5, 8 and 9. In one embodiment, the exposed surfaces of the submount 129 may be coated with silver or other reflective material to reflect light inside of enclosure 112 during operation of the lamp. The submount may comprise a series of anodes and cathodes arranged in pairs for connection to the LEDs 127. An LED or LED package containing at least one LED 127 is secured to each anode and cathode pair where the LED/LED package spans the anode and cathode. The LEDs/LED packages may be attached to the submount by soldering. In the illustrated embodiment 20 pairs of anodes and cathodes are shown for an LED assembly having 20 LEDs; however, a greater or fewer number of anode/cathode pairs and LEDs may be used. Moreover, more than one submount may be used to make a single LED assembly 130. Connectors or conductors such as traces connect the anode from one pair to the cathode of the adjacent pair to provide the electrical path between the anode/cathode pairs during operation of the LED assembly 130.

The MCPCB comprises a thermally and electrically conductive core made of aluminum or other similar pliable metal material. The core is covered by a dielectric material such as polyimide. Metal core boards allow traces to be formed therein. In one method, the core board is formed as a flat member and is bent into a suitable shape. Because the core board is made of thin bendable material and the anodes and cathodes may be positioned in a wide variety of locations, and the number of LED packages may vary, the metal core board may be configured such that it may be bent into a wide variety of shapes and configurations.

Referring to FIGS. 8 and 9, in one embodiment the MCPCB is formed as a flat member having a first LED mounting portion 151 on which the LEDs/LED packages containing LEDs 127 are mounted. The first portion 151 may be divided into sections by thinned areas or score lines 151a. The LEDs/LED packages are located on the sections such that the core board may be bent along the score lines to form the planar core board into a variety of three-dimensional shapes where the shape is selected to project a desired light pattern from the lamp 100.

In another embodiment of the LED assembly 130 the submount 129 comprises a hybrid of a metal core board and lead frame. The metal core board forms the LED mounting portion 151 on which the LED packages containing LEDs 127 are mounted where the back side of the metal core board may be mechanically coupled to a lead frame structure. The lead frame structure forms the connector portion 153. Both the lead frame and the metal core board may be bent into the various configurations as discussed herein.

The submount 129 may be bent or folded or otherwise shaped such that the LEDs 127 provide the desired light pattern in lamp 100. In one embodiment the submount 129 is bent into a cylindrical shape as shown in the figures. The LEDs 127 are disposed about the axis of the cylinder such that light is projected outward. The LEDs 127 may be arranged around the perimeter of the LED assembly to project light radially. Because the submount 129 is pliable and the LED placement on the substrate may be varied, the submount may be formed and bent into a variety of configurations. The angles of the LEDs and the number of LEDs may be varied to create a desired light pattern.

The LED assembly 130 may be advantageously bent or formed into any suitable three-dimensional shape. A "three-dimensional" LED assembly as used herein and as shown in the drawings means an LED assembly where the substrate comprises mounting surfaces for different ones of the LEDs that are in different planes such that the LEDs mounted on those mounting surfaces are also oriented in different planes. In some embodiments the planes are arranged such that the LEDs are disposed over a 360 degree range. The substrate may be bent from a flat configuration, where all of the LEDs are mounted in a single plane on a generally planar member, into a three-dimensional shape where different ones of the LEDs and LED mounting surfaces are in different planes.

With respect to the features described above with various example embodiments of a lamp, the features can be combined in various ways. For example, the various methods of including phosphor in the lamp can be combined and any of those methods can be combined with the use of various types of LED arrangements such as bare die vs. encapsulated or packaged LED devices. The embodiments shown herein are examples only, shown and described to be illustrative of various design options for a lamp with an LED array.

LEDs and/or LED packages used with an embodiment of the invention and can include light emitting diode chips that emit hues of light that, when mixed, are perceived in combination as white light. Phosphors can be used as described to add yet other colors of light by wavelength conversion. For example, blue or violet LEDs can be used in the LED assembly of the lamp and the appropriate phosphor can be in any of the ways mentioned above. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED devices include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. A phosphor can be used that, when excited, emits light having a dominant wavelength from 560 to 580 nm, so as to form a blue-shifted-yellow light with light from the former LED devices. In another example embodiment, one group of LEDs emits light having a dominant wavelength of from 435 to 490 nm and the other group emits light having a dominant wavelength of from 600 to 640 nm. The phosphor, when excited, emits light having a dominant wavelength of from 540 to 585 nm. A further detailed example of using groups of LEDs emitting light of different wavelengths to produce substantially while light can be found in issued U.S. Pat. No. 7,213,940, which is incorporated herein by reference.

Figure 39:
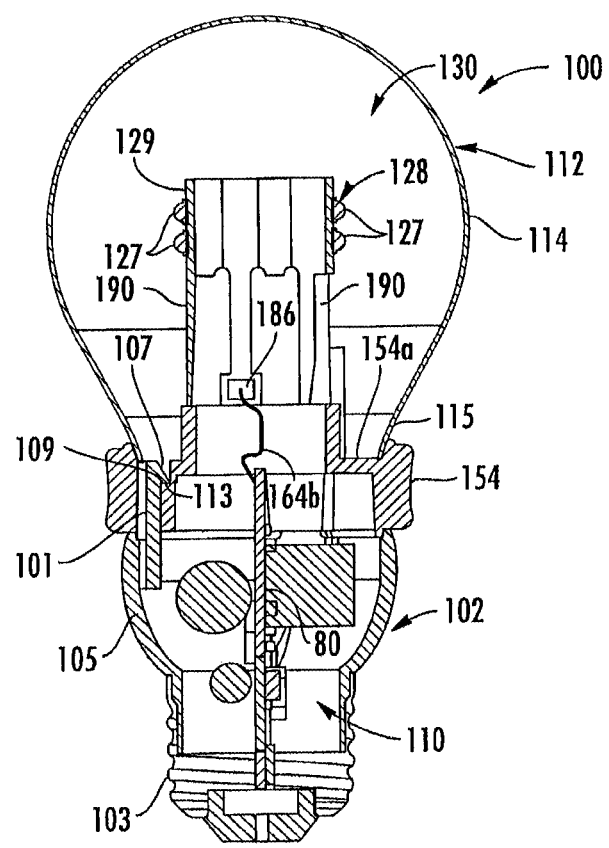
FIG. 39 is a section view of an alternate embodiment of the lamp of the invention.
Figure 40:
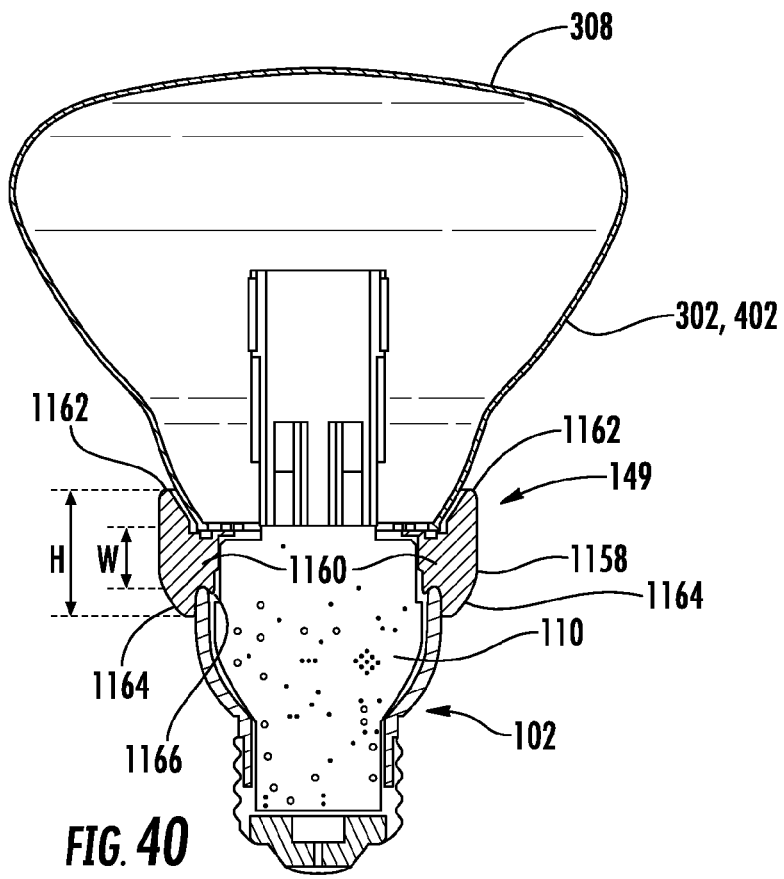
FIG. 40 is a section view of an alternate embodiment of a directional lamp of the invention showing an alternate embodiment of the heat sink.
Figure 41:
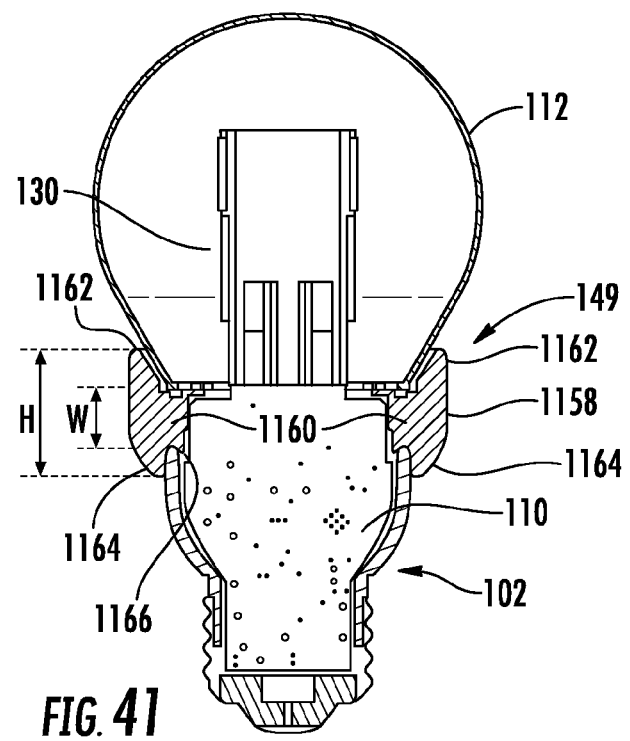
FIG. 41 is a section view of an alternate embodiment of an omnidirectional lamp of the invention showing the heat sink of FIG. 40.
Figure 44:
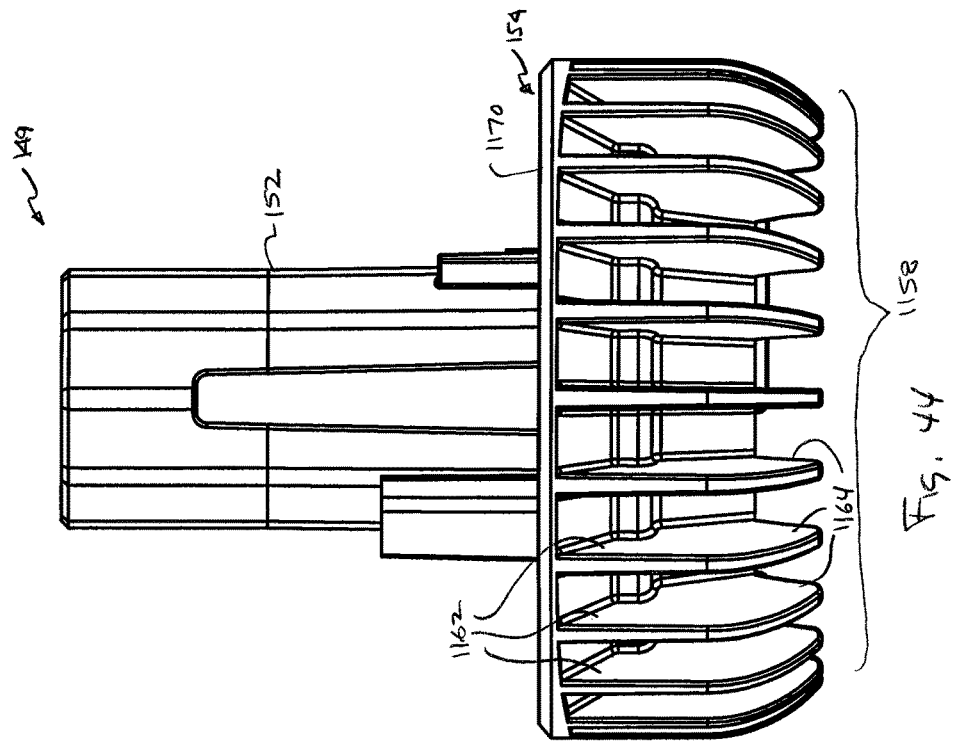
FIG. 44 is a right side view of the embodiment of the heat sink of FIG. 42.
Figure 42:
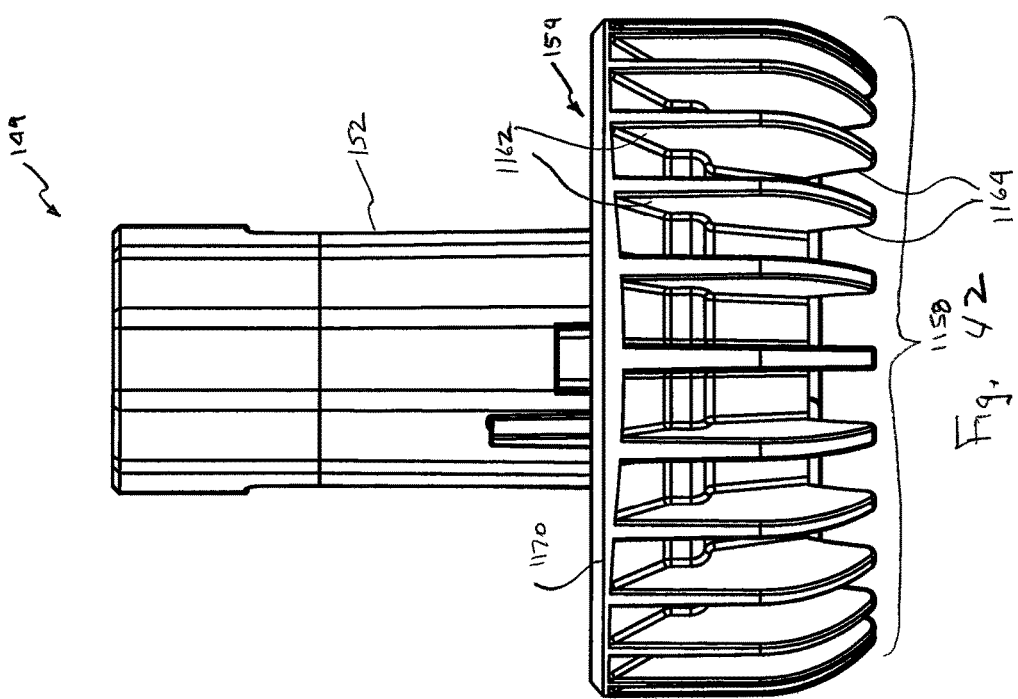
FIG. 42 is a front view of an embodiment of a heat sink.
Figure 45:
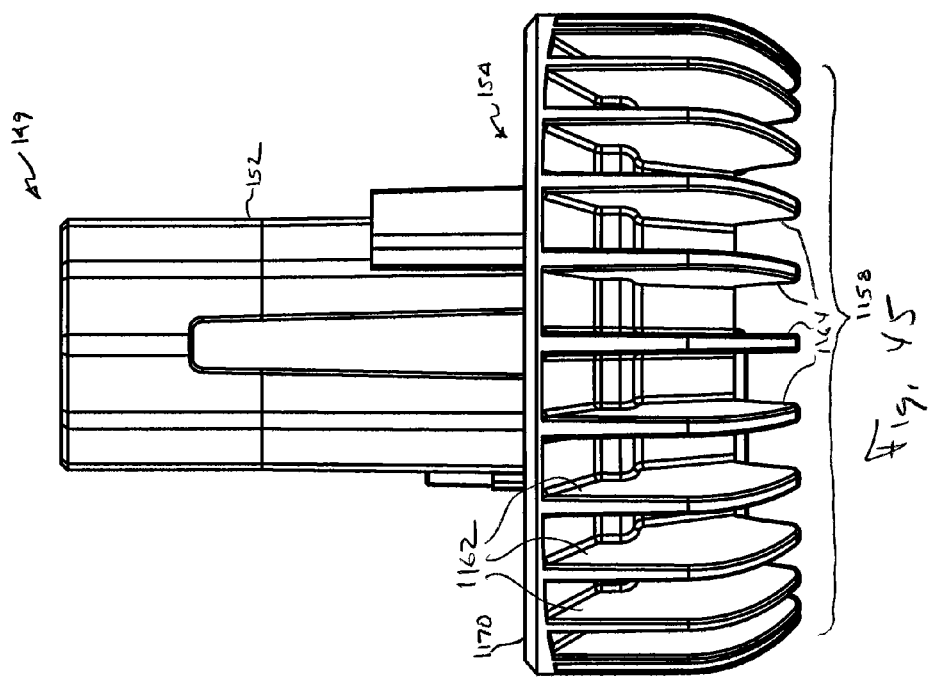
FIG. 45 is a left side view of the embodiment of the heat sink of FIG. 42.
Figure 43:
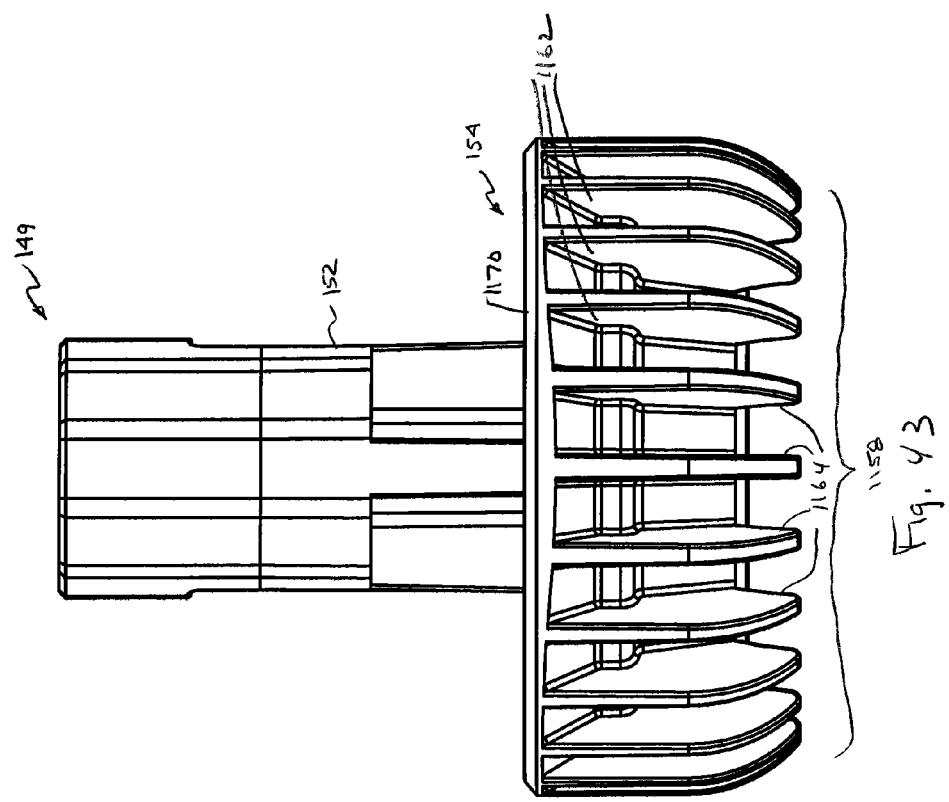
FIG. 43 is a back view of the embodiment of the heat sink of FIG. 42.
Figure 46:
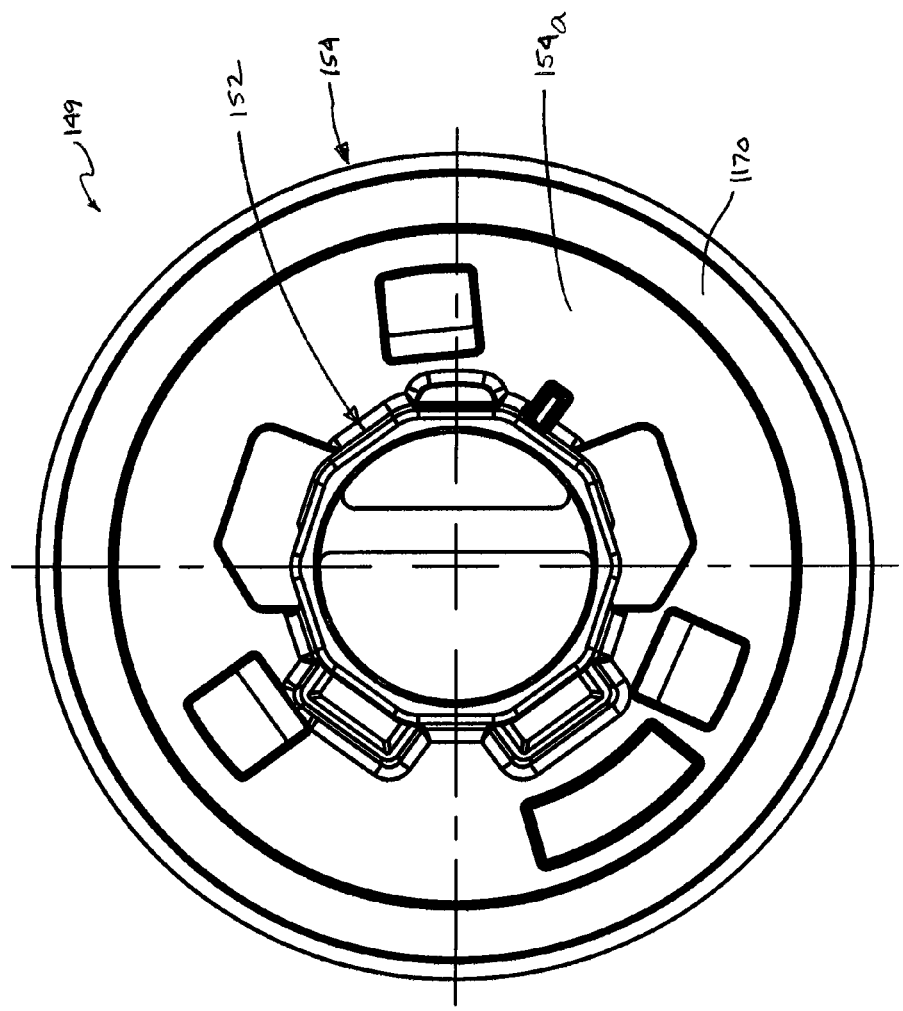
FIG. 46 is a top view of the embodiment of the heat sink of FIG. 42.
Figure 49:
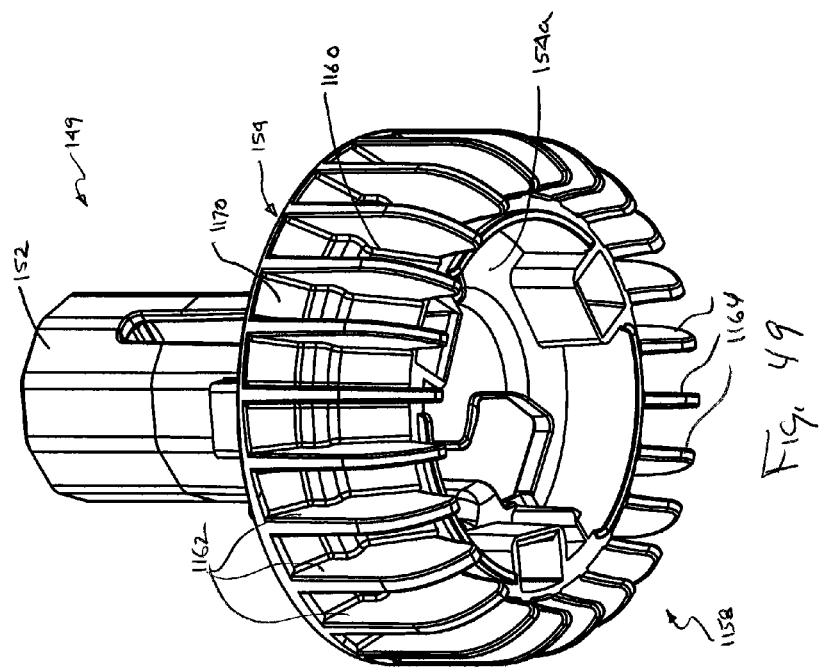
FIG. 49 is a bottom perspective view of the embodiment of the heat sink of FIG. 42.
Figure 48:
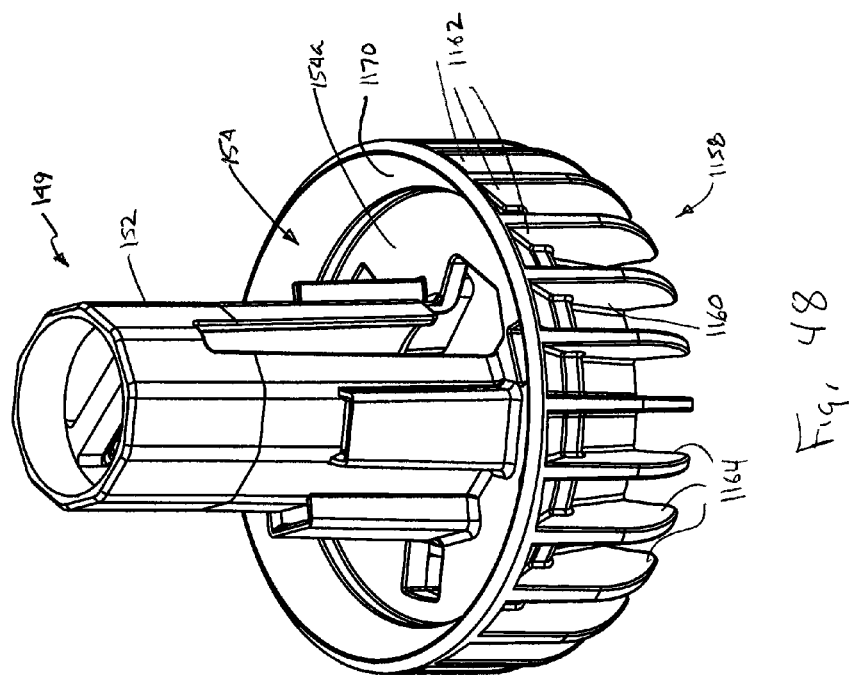
FIG. 48 is a top perspective view of the embodiment of the heat sink of FIG. 42.
Figure 52:
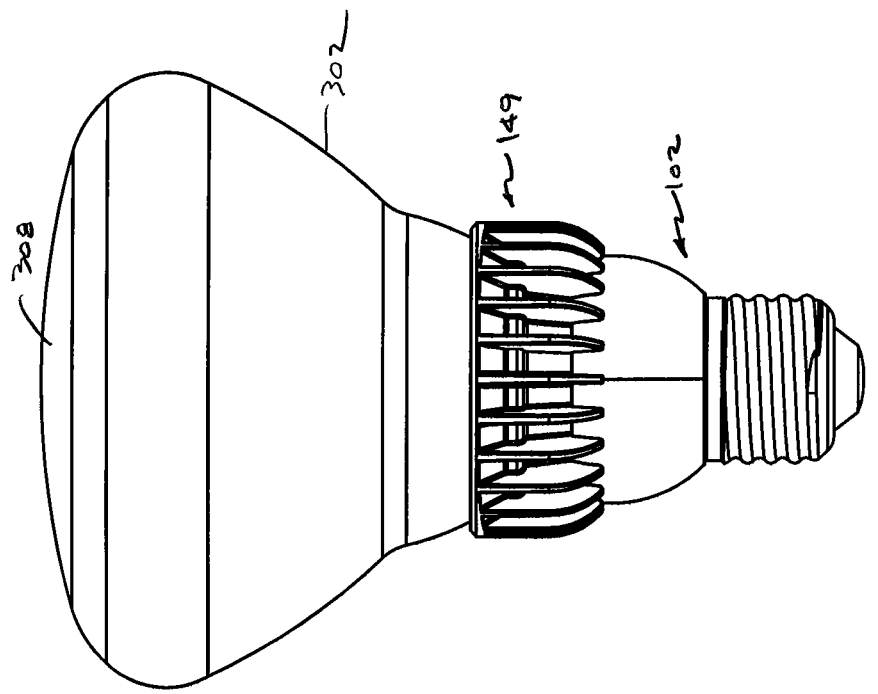
FIG. 52 is a right side view of the embodiment of the lamp of FIG. 50.
Figure 50:
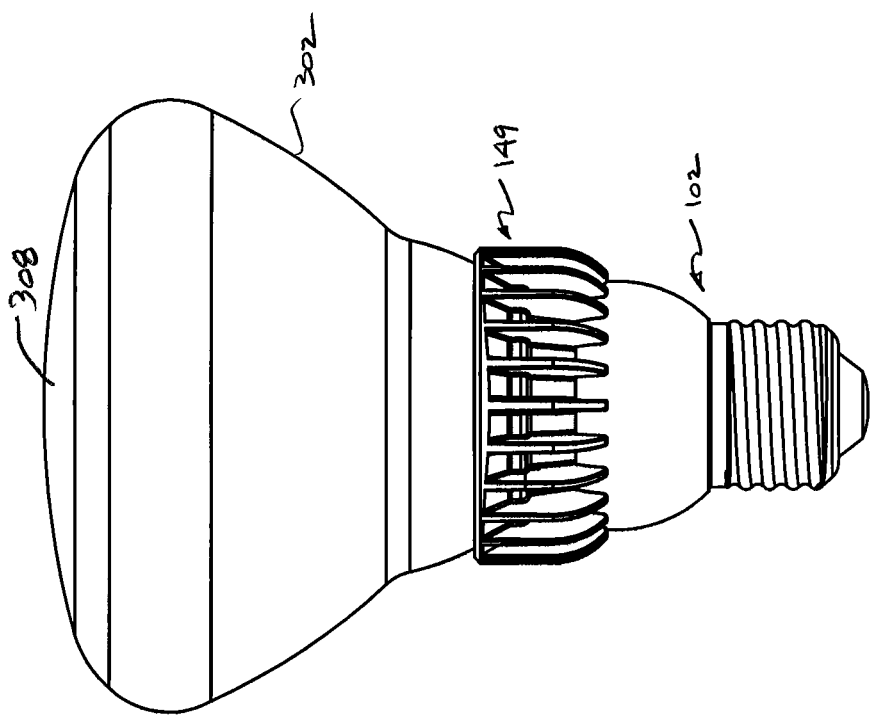
FIG. 50 is a front view of an embodiment of a lamp.
Figure 53:
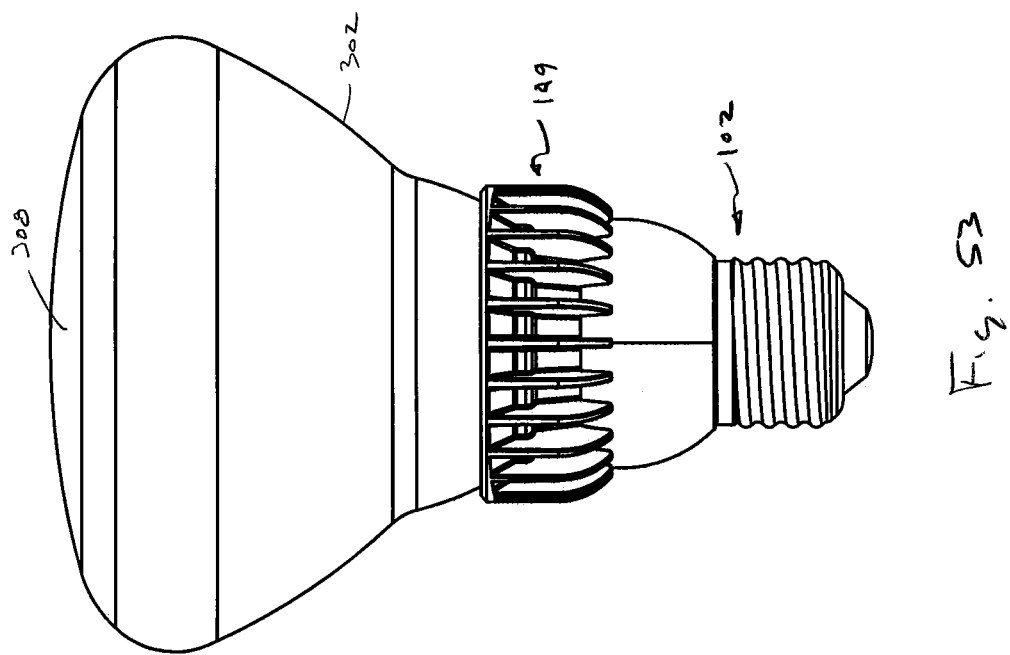
FIG. 53 is a left side view of the embodiment of the lamp of FIG. 50.
Figure 51:
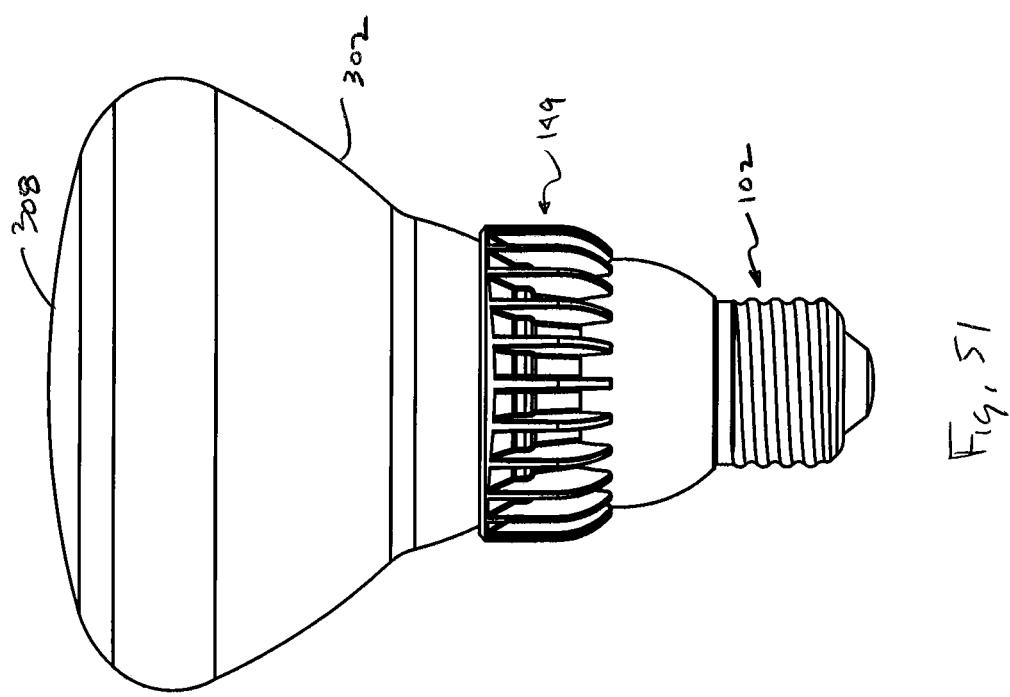
FIG. 51 is a back view of the embodiment of the lamp sink of FIG. 50.
Figure 54:
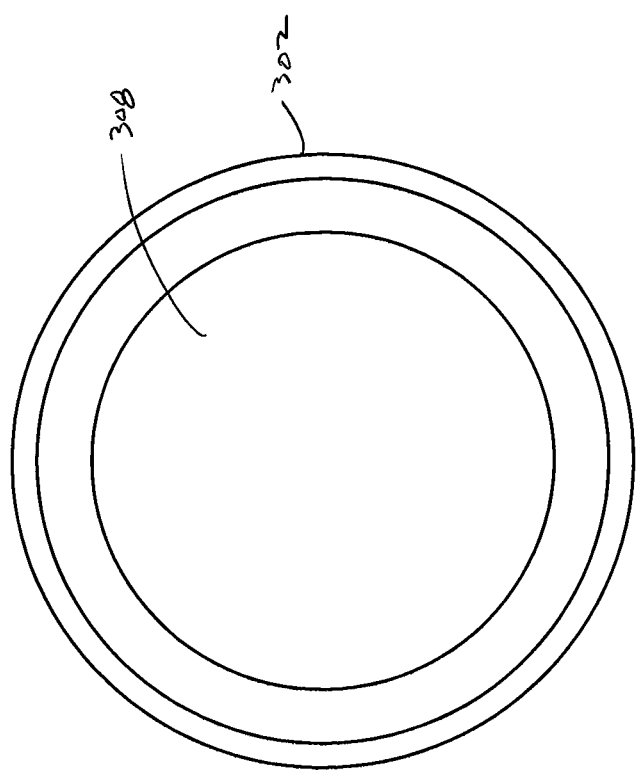
FIG. 54 is a top view of the embodiment of the lamp of FIG. 50.
Figure 53:
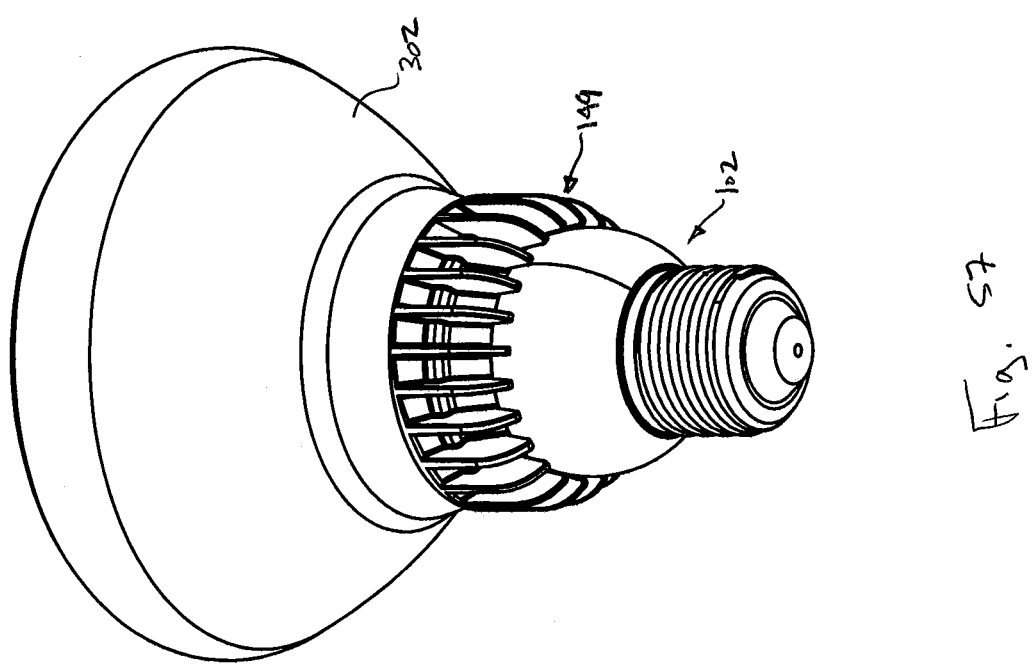
Figure 60:
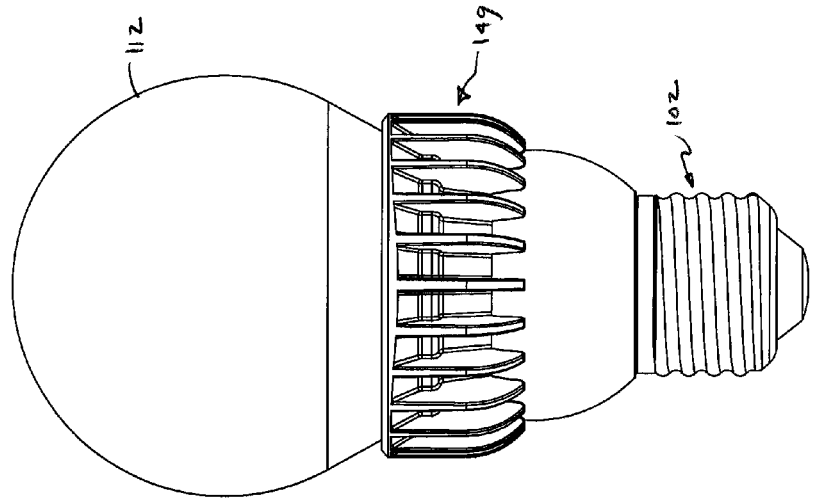
FIG. 60 is a right side view of the embodiment of the lamp of FIG. 58.
Figure 61:
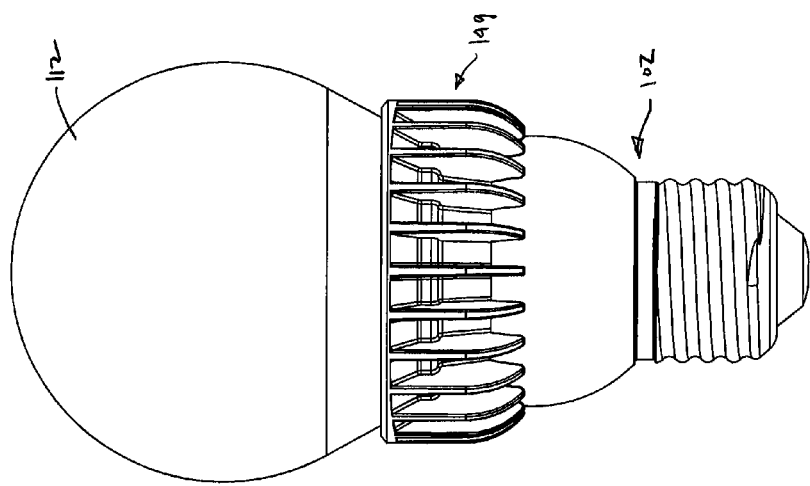
FIG. 61 is a left side view of the embodiment of the lamp of FIG. 58.
Figure 58:
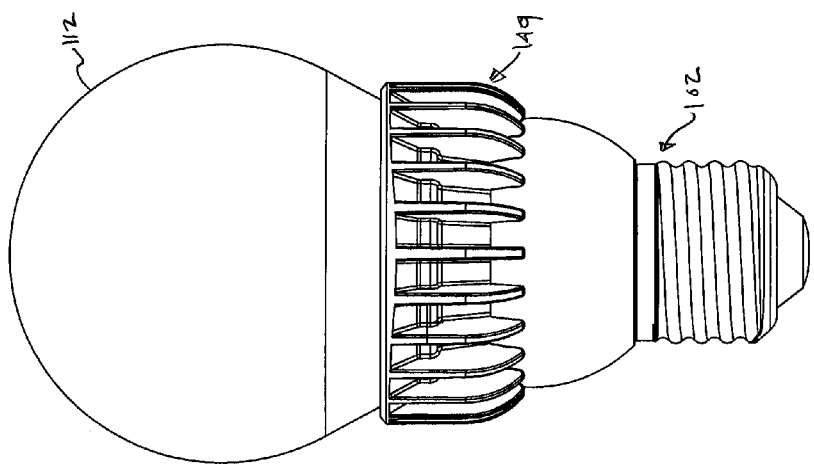
FIG. 58 is a front view of an alternate embodiment of a lamp.
Figure 64:
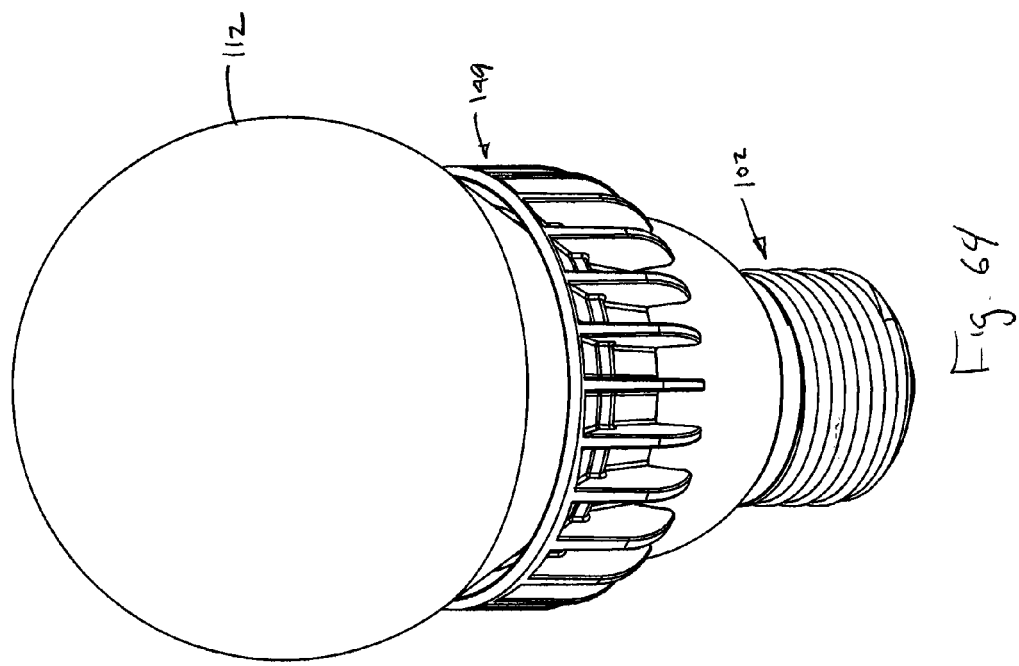
FIG. 64 is a top perspective view of the embodiment of the lamp of FIG. 58.
Figure 59:
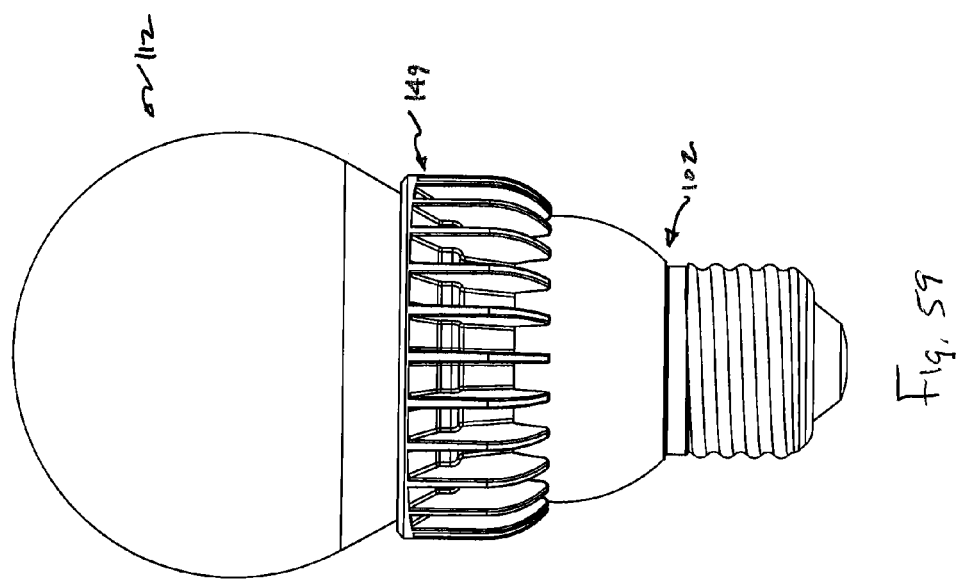
FIG. 59 is a back view of the embodiment of the lamp sink of FIG. 58.
Figure 63:
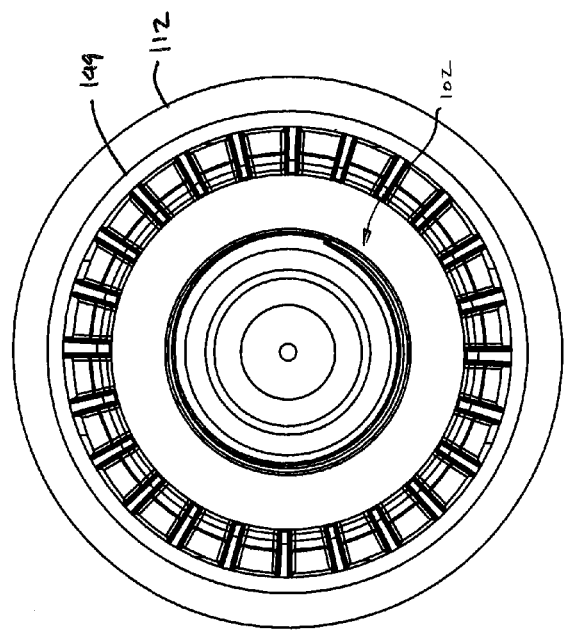
FIG. 63 is a bottom view of the embodiment of the lamp of FIG. 58.
Figure 62:
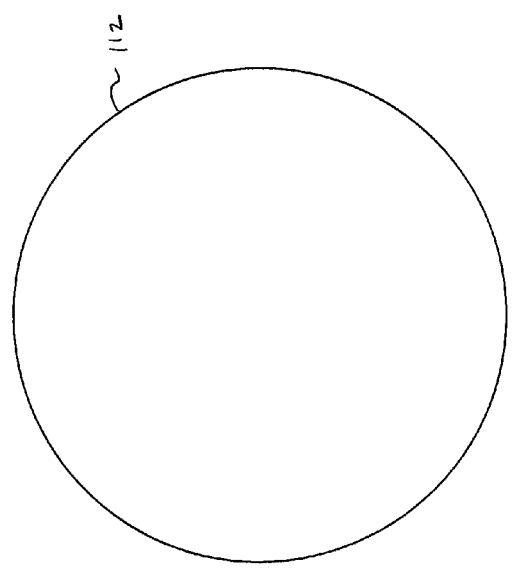
FIG. 62 is a top view of the embodiment of the lamp of FIG. 58.

Referring again to FIGS. 2-7, the LED assembly 130 may be mounted to the heat sink structure 149 by an electrical interconnect 150 where the electrical interconnect 150 provides the electrical connection between the LED assembly 130 and the lamp electronics 110. The heat sink structure 149 comprises a heat conducting portion or tower 152 and a heat dissipating portion 154 as shown for example in FIG. 5 and FIGS. 42-49. In one embodiment the heat sink 149 is made as a one-piece member of a thermally conductive material such as aluminum. The heat sink 149 may also be made of multiple components secured together to form the heat sink. Moreover, the heat sink 149 may be made of any thermally conductive material or combinations of thermally conductive materials. In some embodiments the heat conducting portion 152 may be made of non-thermally conducting material such as plastic or portion 152 may be eliminated completely as shown in FIG. 39. In these embodiments, the LED assembly 130 may be directly thermally coupled to the heat dissipating portion 154 without the use of a separate heat conducting portion. The heat conducting portion 152 may be formed as a tower that is dimensioned and configured to make good thermal contact with the LED assembly 130 such that heat generated by the LED assembly 130 may be efficiently transferred to the heat sink 149. The heat sink 149 may be formed in a wide variety of shapes and sizes provided that sufficient heat is conducted away from the LED assembly 130 that the operation and/or life expectancy of the LEDs are not adversely affected.

The heat dissipating portion 154 is thermally coupled with the heat conducting portion 152 such that heat conducted away from the LED assembly 130 by the heat conducting portion 152 may be efficiently dissipated from the lamp 100 by the heat dissipating portion 154. In one embodiment the heat conducting portion 152 and heat dissipating portion 154 are formed as one-piece. The heat dissipating portion 154 extends from the interior of the enclosure 112, 302, 402 to the exterior of the lamp 100 such that heat may be dissipated from the lamp to the ambient environment. In one embodiment the heat dissipating portion 154 is formed generally as a disk where the distal edge of the heat dissipating portion 154 extends outside of the lamp and forms an annular ring that sits on top of the open end of the base 102. A plurality of heat dissipating members 158 may be formed on the exposed portion to facilitate the heat transfer to the ambient environment. In one embodiment, the heat dissipating members 158 comprise a plurality fins that extend outwardly to increase the surface area of the heat dissipating portion 154. The heat dissipating portion 154 and fins 158 may have any suitable shape and configuration. One particularly suitable arrangement of the fins will be described.

The LED assembly 130 may thermally couple to the heat sink 149 in a variety of manners. For example, the heat sink may only comprise the heat dissipating portion 154 and the heat conducting portion or tower 152 may be integrated with the LED assembly 130 such that the integrated heat sink portion and LED assembly engage the heat dissipating portion 154 at its base. In other embodiments, the LED assembly 130 may engage the heat conducting portion 152 of the heat sink 149 where the LED assembly does not include the connector portion 153. In some embodiments, the LED assembly and heat sink may be integrated into a single piece or be multiple pieces other than as specifically defined.

Figure 6:
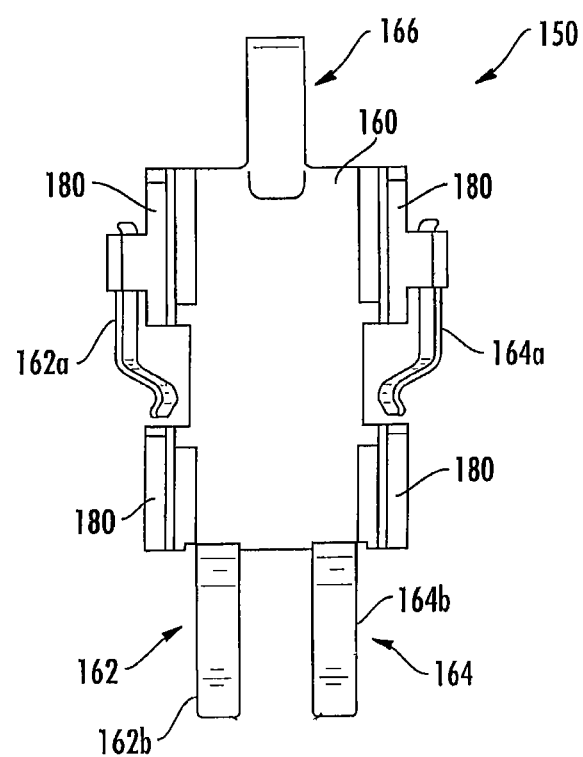
FIG. 6 is a plan view showing an embodiment of the electrical interconnect of FIG. 1.
Figure 7:
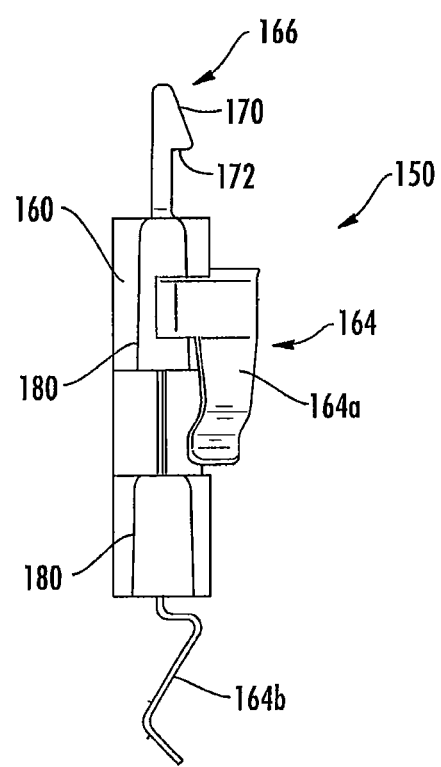
FIG. 7 is a side view showing an embodiment of the electrical interconnect of FIG. 1.

The electrical interconnect 150 provides the electrical conductors to connect the LED assembly 130 to the lamp electronics 110. A support and/or alignment arrangement is configured to position the first and/or second set of contacts relative to the corresponding electrical contacts of the LED assembly with power supply, AC line or drive electronics depending on the embodiment. The electrical interconnect enables this connection to be made in an easy fashion to improve manufacturability by reducing the need for soldering of the electrical contacts. As shown in FIGS. 6 and 7, the electrical interconnect 150 comprises a body 160 that includes a first conductor 162 for connecting to one of the anode or cathode side of the LED assembly 130 and a second conductor 164 for connecting to the other one of the anode or cathode side of the LED assembly 130. The first conductor 162 forms an LED-side contact 162a and a lamp electronics-side contact 162b. The second conductor 164 forms an LED-side contact 164a and a lamp electronics-side contact 164b.

The support and/or alignment mechanism may comprise a first engagement member 166 on body 160 that engages a mating second engagement member 168 on the heat sink 149. In one embodiment the first engagement member 166 comprises a deformable resilient finger that comprises a camming surface 170 and a lock member 172. The second engagement member 168 comprises a fixed member located in the internal cavity 174 of the heat sink 149. The electrical interconnect 150 may be inserted into the cavity 174 from the bottom of the heat sink 149 and moved toward the opposite end of the heat sink such the engagement of the lock member 172 with the fixed member 168 fixes the electrical interconnect 150 in position in the heat sink 149. The snap-fit connection allows the electrical interconnect 150 to be inserted into and fixed in the heat sink 149 in a simple insertion operation without the need for any additional connection mechanisms, tools or assembly steps.

The support and/or alignment arrangement may properly orient the electrical interconnect 150 in the heat sink 149 and provide a passage for the LED-side contacts 162a, 164a, and may comprise a first slot 176 and a second slot 178 formed in the heat conducting portion 152. The first slot 176 and the second slot 178 may be arranged opposite to one another and receive ears or tabs 180 that extend from the body 160 such that as the electrical interconnect 150 is inserted into the heat sink 149, the tabs 180 engage the slots 176, 178 to guide the electrical interconnect 150 into the heat sink 149.

The first LED-side contact 162a and the second LED-side contact 164a are arranged such that the contacts extend through the first and second slots 176, 178, respectively, and are exposed on the outside of the heat conducting portion 152. The contacts 162a, 164a are arranged such that they create an electrical connection to the anode side and the cathode side of the LED assembly 130 when the LED assembly 130 is mounted on the heat sink 149.

The first electronic-side contact 162b and the second electronic-side contact 164b are arranged such that the contacts 162b, 164b extend beyond the bottom of the heat sink 149 when the electrical interconnect 150 is inserted into the heat sink 149. The contacts 162b, 164b are arranged such that they create an electrical connection to the anode side and the cathode side of the lamp electronics 110.

To mount the LED assembly 130 on the heat sink 149 the heat conducting portion 152 of heat sink 149 is inserted into the LED assembly 130 such that the LED assembly 130 surrounds and contacts the heat conducting portion 152. The LED assembly 130 comprises an anode side contact 186 and a cathode side contact 188. The contacts 186, 188 may be formed as part of the conductive submount 129 on which the LEDs are mounted. The contacts 186, 188 are electrically coupled to the LEDs 127 such that they form part of the electrical path between the lamp electronics 110 and the LED assembly 130. The contacts 186, 188 extend from the LED mounting portion 151 such that when the LED assembly 130 is mounted on the heat sink 149 the contacts 186, 188 engage the LED-side contacts 162a, 164a to ensure a good electrical coupling between the LED-side contacts 162a, 164a and the LED assembly 130.

To position the LED assembly 130 relative to the heat sink and to fix the LED assembly 130 to the heat sink, a pair of extensions 190 are provided on the LED assembly 130 that engage mating receptacles 192 formed on the heat sink. In one embodiment the extensions 190 comprise portions of the submount 129 that extend away from the LED mounting area 151 of the LED assembly 130. The extensions 190 extend toward the bottom of the heat sink 149 along the direction of insertion of the LED assembly 130 onto the heat sink. The heat sink 149 is formed with mating receptacles 192 that are dimensioned and arranged such that one of the extensions 190 is inserted into each of the receptacles 192 when the heat sink 149 is inserted into the LED assembly 130. The engagement of the extensions 190 and the receptacles 192 properly positions the LED assembly 130 relative to the heat sink during assembly of the lamp.

Moreover, to fix the LED assembly 130 on the heat sink 149 and to seat the LED assembly 130 against the heat conducting portion 152 to ensure good thermal conductivity between these elements, the extensions 190 are formed with camming surfaces 194 that engage the receptacles 192 and clamp the LED assembly 130 on the heat sink 149. It will be appreciated that as the submount is formed into the three-dimensional shape, free ends of the submount 129 may be brought into close proximity to one another. When the planar submount is bent into the three-dimensional cylindrical shape of FIG. 5, the free ends 129a, 129b of the submount 129 are brought closely adjacent to one another. As shown in FIGS. 5 and 8, a surface of each of the extensions 190 is formed as a camming surface 194 such that as each extension 190 is inserted into the corresponding receptacle 192 the wall of the receptacle 192 engages the camming surface 194 and, due to the angle or shape of the camming surface 194, exerts a force on the LED assembly 130 tending to move one free end 129a of the LED assembly 130 toward the opposite free end 129b of the LED assembly 130. As the free ends of the LED assembly 130 are moved toward one another, the inner circumference of the LED assembly 130 is gradually reduced such that the LED assembly 130 exerts a tight clamping force on the heat conducting portion 152. The clamping force holds the LED assembly 130 on the heat sink 149 and ensures a tight surface-to-surface engagement between the LED assembly 130 and the heat sink 149 such that heat generated by the LED assembly 130 is efficiently transferred to the heat sink 149. Other mechanisms for thermally coupling the LEDs or LED assembly to a heat sink may also be used and the exemplary embodiment is by way of example only.

Figure 4:
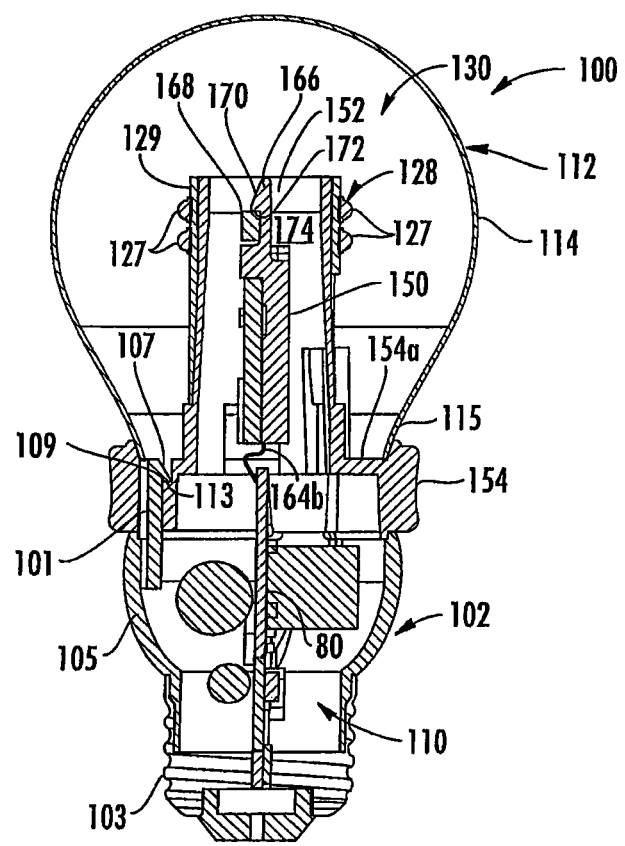
FIG. 4 is a section view taken along line 4-4 of FIG. 1.

Once the heat sink/LED assembly subcomponent is completed, the subcomponent may be attached to the base 102 as a unit. First engagement members on the base 102 may engage mating second engagement members on the heat sink structure 149. In one embodiment, the first engagement members comprise deformable resilient fingers 101 that comprise a camming surface 107 and a lock member 109 (FIGS. 2 and 4). The second engagement members comprise apertures 111 formed in the heat sink 149 that are dimensioned to receive the fingers 101. The apertures 111 define fixed members 113 that may be engaged by the lock members 109 to lock the fingers 101 to the heat sink 149. The base 102 may be moved toward the bottom of the heat sink 149 such that fingers 101 are inserted into apertures 111. The engagement of the lock members 109 with the fixed members 113 fixes the base 102 to the heat sink 149. The snap-fit connection allows the base 102 to be fixed to the heat sink 149 in a simple insertion operation without the need for any additional connection mechanisms, tools or assembly steps.

As the base 102 is brought into engagement with the heat sink 149, electronic-side contacts 162*b*, 164*b* are inserted into the base 102. The lamp electronics 110 are provided with contact pads 96, 98 that are arranged such that when the base 102 is assembled to the heat sink 149, the electronic-side contacts 162*b*, 164*b* are in electrical contact with the pads 96, 98 to complete the electrical path between the base 102 and the LED assembly 130.

The enclosure 112 may be attached to the heat sink 149. In one embodiment, the LED assembly 130 and the heat conducting portion 152 are inserted into the enclosure 112 through the neck 115. The neck 115 and heat sink dissipation portion 154 are dimensioned and configured such that the rim of the enclosure 112 sits on the upper surface 154*a* of the heat dissipation portion 154 with the heat dissipation portion 154 disposed at least partially outside of the enclosure 112, between the enclosure 112 and the base 102. To secure these components together a bead of adhesive may be applied to the upper surface 154*a* of the heat dissipation portion 154. The rim of the enclosure 112 may be brought into contact with the bead of adhesive to secure the enclosure 112 to the heat sink 149 and complete the lamp assembly. In addition to securing the enclosure 112 to the heat sink 149 the adhesive is deposited over the snap-fit connection formed by fingers 101 and apertures 111. The adhesive flows into the snap fit connection to permanently secure the heat sink to the base.

In the lamp of the invention, the LEDs 127 are arranged at or near the optical center of the enclosure 112 in order to efficiently transmit the lumen output of the LED assembly through the enclosure 112. The most efficient transmission of light through a transparent or semitransparent surface is when the light incident to the surface is normal to the surface. For example, if the enclosure is a perfect sphere, an omnidirectional light source located at the center of the sphere provides the most efficient transmission of light through the enclosure because the light is normal to the surface of the enclosure at all points on the sphere's surface. In the lamp of the invention the LEDs 127 are arranged at or near the optical center of the enclosure 112 to maximize the amount of light that is normal to the surface of enclosure 112. While all of the light emitted from LEDs 127 is not normal to the enclosure 112, with the LED assembly positioned at or near the optical center of the enclosure more of the light is normal to the enclosure than in solid state lamps where the light source is located near the base of the enclosure or is otherwise located such that a large portion of the light is incident on the enclosure at other than right angles. By facing the LEDs 127 outwardly, the LEDs emit light in a generally hemispherical pattern that maximizes the amount of light that is normal to the enclosure 112. Thus, the arrangement of the outwardly facing LEDs at or near the optical center of the enclosure, as shown in the figures, provides efficient transmission of the light through the enclosure 112 to increase the overall efficiency of the lamp.

A second mechanism that may be used in the lamp of the invention to increase the overall efficiency of the lamp is the use of a boost converter topology power supply to minimize losses and maximize conversion efficiency. Examples of boost topologies are described in U.S. patent application Ser. No. 13/462,388, entitled "Driver Circuits for Dimmable Solid State Lighting Apparatus", filed on May 2, 2012 which is incorporated by reference herein in its entirety; and U.S. patent application Ser. No. 13/662,618, entitled "Driving Circuits for Solid-State Lighting Apparatus with High Voltage LED Components and Related Methods", filed on Oct. 29, 2012 which is incorporated by reference herein in its entirety. With boost technology there is a relatively small power loss when converting from AC to DC. For example, boost technology may be approximately 92% efficient while other power converting technology, such as Bud technology, may be approximately 85% efficient. Using a less efficient conversion technology decreases the efficiency of the system such that significant losses occur in the form of heat. The increase in heat must be dissipated from the lamp because heat adversely affects the performance characteristics of the LEDs. The increase in efficiency using boost technology maximizes power to the LEDs while minimizing heat generated as loss. As a result, use of boost topology, or other highly efficient topology, provides an increase in the overall efficiency of the lamp and a decrease in the heat generated by the power supply.

In one embodiment of the invention as shown and described herein, 20 LEDs are provided where each LED comprises four LED chips. Each chip may be a 3 volt LED chip such that each LED is a 12 volt part. Using 20 LEDs provides an LED assembly of approximately 240 volts. Such an arrangement provides a lamp having an output comparable to a 60 Watt incandescent bulb. The use of 20 LEDs each comprising 4 LED chips provides a LED light source having a relatively large epitaxial (EPI) or light producing area where each LED may be operated at relatively low current. In one embodiment described herein each LED chip may comprise a DA600 chip sold by CREE Inc., where each chip is a square 600 micron chip having an EPI area of approximately 0.36 mm$^2$ such that each LED having 4 LED chips has approximately 1.44 mm$^2$ of EPI area. A system such as described herein with 20 LEDs has approximately 28.8 mm$^2$ of EPI area.

Generally speaking, in a typical LED the greater the operating current of the LEDs the higher the lumen output of the LED. As a result, in a typical LED lamp the LEDs are operated in the area of about 350 mA/(mm$^2$ of EPI area) in order to maximize the lumen output per square mm of EPI area. While operating the LEDs at high current increases the lumen output it also decreases the efficiency (lumens per watt) of the LEDs such that significant losses occur in the form of heat. For example, the efficiency of one typical LED is greatest in the 60-90 mA/(mm$^2$ of EPI area) and gradually decreases as the mA/(mm$^2$ of EPI area) increases. The increase in heat due to the lowering of efficiency must then be dissipated from the lamp because heat adversely affects the performance characteristics of the LEDs. The present invention uses the generally inverse relationship between efficiency and lumen output to provide lumen output at a desired level in a more efficient (i.e. less heat loss per lumen) lamp. While the relationship between efficiency and lumen output is described as generally inverse it is noted that efficiency also decreases at low current per unit area of EPI such that decreasing current below the high efficiency range provides an LED that is both less efficient and produces fewer lumens per unit area of EPI. Thus, it is desired to operate the LEDs in the area of greatest efficiency while providing a desired lumen output using a relatively large EPI area. The large EPI area may be provided using a plurality of LEDs that together provide the desired large EPI area.

Using a large EPI area LED assembly operating at a relatively low current decreases the lumen output per unit of EPI area but increases the efficiency of the LEDs such that less heat is generated per lumen output. The lower lumen output per unit of EPI area is offset by using a larger EPI area such that the lumen output of the lamp is increased per unit of heat generated by the system. In one embodiment, an LED assembly having approximately 28.8 mm$^2$ of EPI area is used where the LEDs are operated at approximately 107 mA/(mm$^2$ of EPI area) to provide the equivalent lumens as a 60 Watt incandescent light bulb. To provide the equivalent lumens as a 60 Watt incandescent light bulb an LED assembly having an EPI area of between 15 and 40 mm$^2$ may be used where the LEDs are operated in the range of 200 and 75 mA/(mm$^2$ of EPI area). The larger the EPI area the smaller the operating current such that an LED assembly having 40 mm$^2$ of EPI area is operated at 75 mA/(mm$^2$ of EPI area) and a LED assembly having 15 mm$^2$ of EPI area is operated at 200 mA/(mm$^2$ of EPI area). Other operating parameters for an LED assembly for a 60 watt equivalent lamp are 10 mm$^2$ of EPI area operated at 300 mA/(mm$^2$ of EPI area) and a LED assembly having 20 mm$^2$ of EPI area operated at 150 mA/(mm$^2$ of EPI area). For lamps having lumen output equivalent to other than a 60 watt bulb, such as a 40 watt bulb or a 100 watt bulb these values may be scaled accordingly. While the scaling is not strictly linear the scaling up or down in equivalent wattage is approximately linear. The term large EPI area as used herein means a light producing area of sufficient size to produce the desired lumen output when the LEDs are operated at a current at or near the highest efficiency area on the amperage to lumen per Watt curve for the LED. The desired lumen output can be achieved by increasing and/or decreasing current to the LEDs while simultaneously decreasing and/or increasing the EPI area. The relationship between these variables depends on the amount of heat that may be adequately dissipated from the lamp using a relatively small heat sink and the amount of EPI area (e.g. the number of LEDs) that may be supported in the lamp. The size of the heat sink is selected such that the heat sink does not affect the outward design of the lamp such that the lamp has the same general size, shape and appearance as a traditional incandescent bulb. The size of the EPI area and the mA per unit of EPI area may then be selected to generate heat that is less than the amount of heat that can be adequately dissipated by the heat sink.

As a result, the lamp of the invention generates the desired lumen output while generating significantly less heat than in existing lamps by using the LEDs located at the optical center of the enclosure, boost conversion technology and efficient EPI area to mA/(mm$^2$ of EPI area) as described above. Because of the efficiencies engineered into the lamp, the heat generated by the system is lower compared to existing LED lamps of similar lumen output such that a relatively small heat sink may be used. Because the heat sink may be made smaller than in known LED lamps the form factor of the lamp may follow the form factor of traditional incandescent bulbs. In one embodiment, the lamp 100 is configured to be a replacement for an ANSI standard A19 bulb such that the dimensions of the lamp 100 fall within the ANSI standards for an A19 bulb. The dimensions may be different for other ANSI standards including, but not limited to, A21 and A23 standards. In some embodiments, the LED lamp 100 may be equivalent to standard watt incandescent light bulbs such as, but not limited to, 40 Watt or 60 Watt bulbs. The use of a smaller heat sink allows greater freedom in the design of the physical shape, size and configuration of the lamp such that the lamp may be configured to have a variety of shapes and sizes. Referring to FIG. 1 for example, the heat sink intrudes to a minimal degree on the external form of the lamp such that the lamp may be designed and configured to closely match the size and shape of a standard incandescent bulb such as an A19 bulb. Moreover, because a relatively small heat sink may be used it may be possible to provide sufficient heat dissipation using a thermally conductive base 102 without the intervening heat sink structure 154. In some embodiments of an equivalent 60 watt and 75 watt lamp (total bulb power between 9 and 11 watts), a heat sink having an exposed surface area in the range of range of approximately 20-40 square centimeters is sufficient and may be considered small. In one embodiment for a 60 watt lamp the heat sink may have an exposed surface area of about 30 square centimeters. For 100 W applications (or 75 W applications where higher optical losses are incurred such as in directional lamps with a total bulb power greater than 11 watts but less than 17 watts) the exposed surface area of the heat sink is in the range of range of approximately 40-80 square centimeters. In one embodiment for a 100 watt lamp the heat sink may have an exposed surface area of about 60 square centimeters.

LEDs are thermally responsive light producers where, as the LED gets hotter, the lumens produced by the LED decreases. Because the lamp of the invention uses a relatively large EPI area to more efficiently generate large lumen outputs, the size of the heat sink may be reduced such that the loss of lumen output due to the heating of the LEDs may be designed into the system. In such an arrangement, the LEDs are not cooled to the extent required in existing devices and the heat sink may be correspondingly reduced in size. For example, in one of the most efficient types of commercially available lamps, a troffer lamp, the large heat sink allows the LEDs to operate at about a 4% loss of lumens due to heat. In a typical bulb configuration the loss of lumens due to heat is engineered to be as small as possible and may be on the order of less than 10%. In order to provide such a low "roll off" or loss of lumens due to heat build-up the typical LED lamp requires a relatively large heat sink structure. The lamp of the invention is designed such that the roll off or loss of lumens due to heat build-up may be between approximately 15% and 20%. Such a loss would normally be considered excessive; however, because of the use of a large EPI area and the other efficiencies built into the system as discussed above, the LED lamp of the invention can afford a larger lumen roll off at the LEDs and still provide a lamp that provides the desired lumen output at the system level. In the system of the invention the LEDs are operated at a junction temperature (the temperature at the junction between the LED chip and the package) of between approximately 110° and 120°. Because the LEDs are allowed to operate at a relatively high junction temperature the heat sink may be made smaller and less intrusive when compared to existing LED lamps. As explained above, the ability to use a smaller heat sink structure allows the heat sink to be a smaller and less obtrusive component of the overall lamp allowing the lamp to be configured to be of similar size and shape to a standard incandescent bulb as shown in the figures.

Another embodiment of the heat sink and fins is shown in FIGS. 40-65. The heat sink 149 is shown mounted in a PAR/BR style lamp in FIGS. 40 and 50-57 and is mounted in a omnidirectional A19 style lamp in FIGS. 41 and 58-65. The heat sink 149 comprises a heat conducting portion 152 that is thermally coupled to the LEDs 127 and a heat dissipating portion 154 that is thermally coupled to the LEDs 127 via the heat conducting portion 152 as previously described. The heat dissipating portion 154 has a first part that is disposed in the enclosure 112, 302, 402 and a second part that is disposed outside of the enclosure. While the heat sink 149 is shown having a heat conducting portion 152 and a heat dissipating portion 154 the heat sink 149 may have only a heat dissipating portion 154 as previously described where the heat is conducted to the heat dissipating portion 154 by a mechanism other than a part of the heat sink. For example the LED assembly may be thermally coupled directly to the heat dissipating portion without the use of a heat conducting portion as shown in FIG. 39. Further, the heat conducting portion may be made as a separate component from the heat dissipating portion that it thermally coupled to the heat dissipating portion but that is made of a separate component or plural components.

The heat dissipating portion 154 comprises a plurality of fins 1158 that extend from the heat dissipating portion 154 generally radially such that the fins 1158 extend to the outside of the enclosure 112, 302, 402 and base 102 and are exposed to the ambient environment. Together the base housing 105 and enclosure 112, 302, 404 may be considered to be a lamp housing. While in the illustrated embodiment the fins 1158 are described as extending radially the fins 1158 may extend from the heat dissipating portion 154 other than radially provided that the fins 1158 are thermally coupled to the heat dissipating portion 154 of the heat sink 149 and extend to the exterior of the lamp. The fins 1158 may be considered part of the heat dissipating portion 154 of the heat sink 149 in that any part of the heat sink that extends to the outside of the enclosure 112, 302, 402 is capable of dissipating heat to the ambient environment including the fins 1158. The fins 1158 comprise a stem 1160 that extends from the body 154a of the heat dissipating portion 154. The stem 1160 may extend laterally from the body 154a of the heat dissipating portion 154 or the stems 1160 may extend at various angles relative to the body 154a. The stems 1160 extend to outside of the lamp housing, formed by enclosure 112, 302, 402 and base housing 105, through a gap 1166 formed between the enclosure 112, 302, 402 and the base housing 105. The gap has a width W.

The stems 1160 are dimensioned to extend to the exterior of the lamp to expose portions of the heat sink to the ambient environment while maintaining the desired form factor of the lamp. In some embodiments it is desirable to extend the stems and fins a minimum distance from the enclosure and base such that the form factor of the bulb fits into the envelope for a standard incandescent bulb such as an A19 bulb, PAR bulb or BR bulb. Moreover, even if the lamp of the invention is not intended to conform to a standard form factor, it is often desirable to maintain the form factor of the lamp as small as possible.

In order to increase the exposed surface area of the heat sink 149 while minimizing the distance the fins 1158 extend from the enclosure 112, 302, 402 and base 102, the fins 1158 are formed with cantilevered overhang portions or lips 1162 and 1164 that extend generally along the longitudinal axis of the lamp from the top and bottom of stem 1160. The height H of the fins between the ends of overhangs 1162 and 1164 is greater than the width W of the gap 1166. The height H of the fins between the ends of overhangs 1162 and 1164 is also greater than the width of the stems 1160 that extend through the gap 1166. The upper overhang 1162 extends over the bottom portion of the enclosure 112, 302, 402 and the lower overhang 1164 extends over the top portion of the base 102. By extending the fins 1158 in such a manner the surface area of the exposed portion of the heat sink 149 that is in contact with the ambient environment is increased without significantly increasing the distance the fins 1158 protrude laterally beyond the sides of the lamp as compared to the fins 158 shown in the embodiment of FIG. 1. Further, by using a stem 1160 as the connection between the heat sink portion that is internal to the enclosure and the exterior of the lamp the width of the gap 1166 required to extend the fins 1158 through the lamp, e.g. in the illustrated embodiment the space between the enclosure 112, 302, 402 and the base 102, is minimized to minimize the overall height of the lamp. To obtain the same exposed surface area of the heat sink without using the cantilevered overhangs, the fins would either have to be extended laterally a greater distance or the height of the fins, and therefore the overall height of the lamp, would have to be increased. The overhangs 1162, 1164 allow a larger exposed surface area in a smaller form factor. In the illustrated embodiment, the overhang 1164 extends toward the base and overhang 1162 extends toward the distal end of the enclosure; however, the overhangs may be arranged such that the overhangs extend only toward the base or only toward the distal end of the enclosure. Further, the shape and dimensions of the fins can change from those shown in the drawings for aesthetic purposes or to change the surface area or size of the fins.

In some embodiments the ends of the overhangs 1162 may be connected at their distal ends by a flange 1170 to reinforce the fins 1158 and/or to modify the light distribution of the lamp. The flange 1170 has an annular shape in the illustrated embodiment because the bulb profile is cylindrical; however, if the lamp has other shapes the arrangement of the fins and reinforcement flange may change to match the shape of the lamp. The flange surrounds, or partially surrounds, the enclosure 112, 302, 402 such that light emitted from the enclosure reflects off of a surface or surfaces of the flange 1170 generally toward the distal end of the enclosure. The flange may be provided with a reflective surface such as white optic or a specular surface or the like to reflect and/or diffuse the light in a desired pattern. The reflective surface of the flange, that is the surface of the flange that faces toward the enclosure and reflects the emitted light, may also be shaped to create different light patterns.

The ends of the overhangs may also be free and unsupported by a flange as shown at the bottom overhangs 1164. Because the overhangs are extended a relatively small distance from the stems, approximately 5 mm in a A19 equivalent lamp, the overhangs do not necessarily require a reinforcement flange 1170. Because the heat sink 149 in the present configuration of the lamp can be relatively small, as previously explained, the addition of a 5 mm overhang to each of the fins substantially increases the effectiveness of the heat sink 149. The interior edges of the overhang 1162 and/or flange 70 and overhang 1164 conform to the shape of the enclosure 112, 302, 404 and base 102, respectively, such that the overhangs may be provided with a profile that follows the shape of the lamp. While the fins with the overhangs as described herein have particular applicability to the LED lamp described herein the fins may be used with any LED lamp where an increase in the size of the exposed heat sink is desired, and especially in applications where the size increase is desired with a minimum impact of the form factor of the lamp.

The overhangs 1162 that are extended toward the distal end of the enclosure 112 extend over a portion of the enclosure 112. This arrangement provides a number of benefits in addition to increasing the heat sink size as discussed above. The exposed surfaces are painted white or are a specular surface to reflect light. In an omnidirectional lamp (FIG. 41) the overhangs 1162 that extend over the enclosure 112 reflect some of the light emitted by the LEDs toward the distal end of the enclosure 112. Because in an omnidirectional lamp such as that described herein providing sufficient light toward the top of the lamp may be difficult, the overhangs 1162 and flange 1170 may be used to increase the light output toward the distal end of the lamp by reflecting some light that would otherwise project toward the base 102 toward the distal end of the enclosure 112.

Moreover, in both omnidirectional lamps and directional lamps the overhangs 1162 and 1164 cover the adhesive connection between the enclosure 112, 302, 402 and the heat sink 149 and between the heat sink 149 and base 102 such that any adhesive overflow is hidden by the projecting overhangs to thereby enhance the aesthetics of the lamp.

In some embodiments, the base housing 105 and enclosure 112, 302, 402 together may be considered to be a lamp housing. In some embodiments the heat dissipating portion 154 of heat sink 149 may be considered to extend through a gap in the lamp housing. In the illustrated embodiments, the gap 1166 is formed between the enclosure 112, 302, 402 and the base housing 105. However, in other embodiments the gap may be formed between portions of the base housing 105 where a first portion of the base housing is connected between the heat dissipating portion 154 and the enclosure 112, 302, 402 and the second portion of the base housing 105 with the Edison screw 103 is connected to the opposite side of the heat dissipating portion. The stems 1160 extend from the lamp housing through the gap between the housing portions that form base housing 5 and the overhangs are dimensioned to be wider than the gap. The gap may also be formed between portions of the enclosure 112, 302, 402.

FIGS. 10-13 show an embodiment of a lamp that uses the LED assembly 130, heat sink with the tower arrangement 149, and electrical interconnect 150 as previously described in a BR and PAR type lamp. The previous embodiments of a lamp refer more specifically to an omnidirectional lamp such as an A19 replacement bulb. In the BR or PAR lamp shown in FIGS. 10 and 13 the light is emitted in a directional pattern rather than in an omnidirectional pattern. Standard BR type bulbs are reflector bulbs that reflect light in a directional pattern; however, the beam angle is not tightly controlled and may be up to about 90-100 degrees or other fairly wide angles. The bulb shown in FIGS. 10-12 may be used as a solid state replacement for such BR, PAR or other reflector type bulbs or other similar bulbs.

The lamp comprises a base 102, heat sink 149, LED assembly 130 and electrical interconnect 150 as previously described. As previously explained, the LED assembly 130 generates an omnidirectional light pattern. To create a directional light pattern, a primary reflector 300 is provided that reflects light generated by the LED assembly 130 generally in a direction along the axis of the lamp. Because the lamp is intended to be used as a replacement for a BR type lamp the reflector 300 may reflect the light in a generally wide beam angle and may have a beam angle of up to approximately 90-100 degrees. As a result, the reflector 300 may comprise a variety of shapes and sizes provided that light reflecting off of the reflector 300 is reflected generally along the axis of the lamp. The reflector 300 may, for example, be conical, parabolic, hemispherical, faceted or the like. In some embodiments, the reflector may be a diffuse or Lambertian reflector and may be made of a white highly reflective material such as injection molded plastic, white optics, PET, MCPET, or other reflective materials. The reflector may reflect light but also allow some light to pass through it. The reflector 300 may be made of a specular material. The specular reflectors may be injection molded plastic or die cast metal (aluminum, zinc, magnesium) with a specular coating. Such coatings could be applied via vacuum metallization or sputtering, and could be aluminum or silver. The specular material could also be a formed film, such as 3M's Vikuiti ESR (Enhanced Specular Reflector) film. It could also be formed aluminum, or a flower petal arrangement in aluminum using Alanod's Miro or Miro Silver sheet. The reflector 300 is mounted in the lamp such that it surrounds the LED assembly 130 and reflects some of the light generated by the LED assembly.

The reflector 300 may be mounted on the heat sink 149 or LED assembly 130 using a variety of connection mechanisms. In one embodiment, the reflector 300 is mounted on the heat conducting portion or tower 152 of the heat sink 149. As shown, the reflector 300 is formed as a slip collar with a flare 300a at the end such that when the LED assembly 130 is inserted, the light directed primarily toward the base encounters the reflector 300 and is reflected out the exit surface 308. The LED assembly 130 is mounted as previously described to trap the reflector 300 between the heat sink 149 and the LED assembly 130. The reflector may also be mounted on the dissipating portion 153 of the heat sink. The reflector 300 may also be mounted to the heat sink 149 or LED assembly 130 using separate fasteners, adhesive, friction fit, mechanical engagement such as a snap-fit connection, welding or the like.

In one embodiment, the reflector 300 is made in two portions 350 and 352 that together surround the heat conducting portion or tower 152 and connect to one another using snap fit connectors 354 to clamp the heat sink therebetween as shown in FIGS. 35-38. In the illustrated embodiment the two portions are identical such that a single component may be used although the two portions may be different. The snap fit connectors 354 may comprise a deformable, resilient tang 356 on one reflector portion that is received in a mating receptacle 358 on the other reflector portion where each reflector portion comprises one tang and one receptacle. However, two tangs may be formed on one portion and two receptacles may be formed on the other portion. The tangs 356 may be inserted into the receptacles 358 such that locking surfaces 360 on the tangs 356 are disposed behind the receptacles 358. The structure of the reflector described above may be used with any of the embodiments of the reflector and in any of the lamps described herein.

The reflector 300 is dimensioned such that the LED assembly 130, heat sink 149 and reflector 300 may be inserted through the opening 304 in the neck of a BR type enclosure 302. The LED assembly 130, heat sink 149 and reflector 300 are inserted into the BR enclosure 302. The BR enclosure 302 may be secured to the heat sink 149 as previously described using adhesive or other connection mechanism. The enclosure 302 comprises a body 306 that is typically coated on an interior surface with a highly reflective material such as aluminum to create a reflective surface 310 and an exit surface 308 through which the light exits the lamp. The exit surface 308 may be frosted or otherwise treated with a light diffuser material. Moreover, the reflector 300 may be mounted to the enclosure 302 rather than to the LED assembly and/or heat sink.

As previously explained, the reflector 300 may be positioned such that it reflects some of the light generated by the LED assembly 130. However, at least a portion of the light generated by the LED assembly 130 may not be reflected by the reflector 300. At least some of this light may be reflected by the reflective surface 310 of the enclosure 302. Some of the light generated by the LED assembly 130 may also be projected directly out of the exit surface 308 without being reflected by the primary reflector 300 or the reflective surface 310.

FIGS. 13-19 show an embodiment of a PAR type lamp that uses the LED assembly 130, heat sink with the tower arrangement 149 and electrical interconnect 150 as previously described. In a PAR type lamp the light is emitted in a directional pattern. Standard PAR bulbs are reflector bulbs that reflect light in a direction where the beam angle is tightly controlled using a parabolic reflector. PAR lamps may direct the light in a pattern having a tightly controlled beam angle such as, but not limited to, 10°, 25° and 40°. The bulb shown in FIG. 13 may be used as a solid state replacement for such a reflector type PAR bulb.

To create a directional light pattern, a primary reflector 400 is provided that reflects light generated by the LED assembly 130 generally in a direction along the axis of the lamp. Because the lamp is intended to be used as a replacement for a PAR type lamp, the reflector 400 may reflect the light in a tightly controlled beam angle. The reflector 400 may comprise a parabolic surface 400a such that light reflecting off of the reflector 400 is reflected generally along the axis of the lamp to create a beam with a controlled beam angle.

The reflector 400 is preferably made of a specular material. The specular reflectors may be injection molded plastic or die cast metal (aluminum, zinc, magnesium) with a specular coating. The specular material could also be a formed film, such as 3M's Vikuiti ESR (Enhanced Specular Reflector) film. It could also be formed aluminum, or a flower petal arrangement in aluminum using Alanod's Miro or Miro Silver sheet. In some embodiments, the reflector may be a diffuse or Lambertian reflector and may be made of a white highly reflective material such as injection molded plastic, white optics, PET, MCPET, or other reflective materials. The reflector may reflect light but also allow some light to pass through it. The reflector 400 is mounted in the lamp such that it surrounds the LED assembly 130 and reflects some of the light generated by the LED assembly.

Because the lamp is used as a PAR replacement, the beam angle is tightly controlled where the light that is reflected from the reflector 400 is emitted from the lamp at a tightly controlled the beam angle.

The reflector 400 is mounted such that the light emitted from the LED assembly 130 is emitted at or near the focus of the parabolic reflector 400. Other arrangements of the LEDs may be made provided that the reflector reflects the light at the desired beam angle.

The reflector 400 is dimensioned such that the LED assembly 130, heat sink 149 and reflector 400 may be inserted through the opening 404 in the neck of a PAR type enclosure 402 as previously described. At least a portion of the light generated by the LED assembly 130 may not be reflected by the reflector 400. At least some of this light may be reflected by the parabolic reflective surface 406 of the enclosure 402. Some of the light generated by the LED assembly 130 may be projected out of the exit surface 408 without being reflected by the reflector 400 or the reflective surface 406.

One potential issue with using a single, large parabolic reflector 400 that surrounds the entire LED assembly 130, as described above, is that some of the light may be reflected in a generally horizontal plane such that it circles the reflector 400 and reflects multiple times from the reflector 400 before being emitted from the lamp. Such a situation results in a loss of efficiency. To lower these losses, a parabolic reflector 500 may be provided for each LED 127 such that each LED 127 has associated with it a relatively small parabolic reflector 500 that reflects light from that LED as shown in FIGS. 20-27. The reflectors 500 and LEDs 127 may be in a one-to-one relationship or a single reflector may be used with more than one LED, but with fewer than all of the LEDs of LED array 130. The reflectors 500 may be specular. Moreover, the LED assembly may be modified to allow the mounting of the reflectors with the associated LEDs. For example, the LEDs may need to be more widely spaced to accommodate the reflectors or the LED assembly may need to be made smaller.

As previously explained, the reflectors 500 as described herein may be positioned such that the reflector 500 reflects a portion of the light generated by the LED assembly 130. However, at least a portion of the light generated by the LED assembly 130 may not be reflected by the reflector 500. At least some of this light may be reflected by the reflective surface 406 of the enclosure 402. Some of the light generated by the LED assembly may be projected to the lens portion without being reflected by the reflector or the enclosure.

As was explained with respect to the previously described embodiments of a directional lamp, at least some of the light generated by the LED assembly 130 may be directed toward the exit surface of the lamp. An LED 127 positioned as described herein may have a beam angle of approximately 120° such that at least some of the light emitted from the LEDs 127 is directed directly out the exit surface. In order to capture this light and shape the beam, a reverse or downward facing reflector 1200 may be added as shown in FIGS. 28-34. The reverse reflector 1200 captures light that is projected toward the exit surface of the lamp and reflects that light from reflecting surface 1200a to the primary reflector such that the light may be projected in the desired beam angle by the primary reflector as described above. Any suitable reflector may be used as the reverse reflector to redirect the light toward the primary reflector.

The reflectors as described herein may also be used in an omnidirectional lamp such as the A19 style of lamp shown, for example, in FIG. 1. In an omnidirectional lamp the reflector may be used to provide a greater degree of up lighting, i.e. light toward the free end of the lamp opposite the Edison connector, if desired. In some embodiments, the reflector may have the same shape and size for a BR style lamp, a PAR style lamp and an omnidirectional lamp such as an A19 style lamp where the light is shaped using the material of the reflector. In an omnidirectional style lamp the reflector may be made of a semitransparent or translucent material such that some of the light is reflected but other light is allowed to pass through the reflector. Such an arrangement provides less directional reflection and a more omnidirectional pattern while still providing some light shaping. In a BR style light the reflector may be made of a white material that provides reflection of the light but in a somewhat diffused pattern. In a PAR style lamp the reflector may be made of or coated in a highly reflective material such as but not limited to aluminum or silver to provide specular reflection and a tightly shaped beam. The reflectors made with the various surfaces described herein may be of the same size and shape for the omnidirectional lamp and the directional lamps such that the same type of reflector may be used with the only change being the material in the different forms of the lamp.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A lamp comprising:
   an enclosure;
   a base comprising an electrically conductive connector and an electrically non-conductive housing portion;
   at least one LED located in the enclosure and operable to emit light when energized through an electrical path from the base;
   a heat sink connected to the housing portion comprising a heat dissipating portion that is at least partially exposed to the ambient environment and comprises a plurality of fins, the plurality of fins on the exterior of the lamp and each of the plurality of fins extending over at least one of the housing portion and the enclosure.

2. The lamp of claim 1 wherein the lamp is one of an omnidirectional lamp and a directional lamp.

3. The lamp of claim 1 wherein the heat sink comprises a heat conducting portion that is located in the enclosure and that is thermally coupled to the heat dissipating portion.

4. The lamp of claim 1 wherein the plurality of fins comprise a first portion that extends over the enclosure and a second portion that extends over the base.

5. The lamp of claim 1 wherein the plurality of fins extend generally radially from a body of the heat sink.

6. The lamp of claim 1 wherein the plurality of fins extend along the longitudinal axis of the lamp.

7. The lamp of claim 1 wherein each of the plurality of fins comprise a stem that extends from a body of the heat dissipating portion.

8. The lamp of claim 7 wherein the stem extends between the enclosure and the base.

9. The lamp of claim 1 wherein the heat sink extends between the enclosure and the base.

10. The lamp of claim 1 wherein at least a portion of the enclosure is optically transmissive.

11. The lamp of claim 1 comprising a gap formed in the lamp housing between the enclosure and the base, the heat sink comprising a portion that extends through the gap.

12. A lamp comprising:
    an enclosure;
    a base comprising an electrically conductive connector and an electrically non-conductive housing portion;
    at least one LED located in the enclosure and operable to emit light when energized through an electrical path from the base;
    a heat sink connected to the housing portion comprising a heat dissipating portion having a first part that is located inside of the enclosure and that is thermally coupled to the at least one LED and a second part that is exposed to the ambient environment, the second part comprising a plurality of fins that extend over a portion of the enclosure and a portion of the housing portion.

13. The lamp of claim 12 wherein the heat sink is disposed between the enclosure and the base.

14. The lamp of claim 12 comprising a gap formed in the lamp housing between the enclosure and the base, the heat sink comprising a portion that extends through the gap.

15. A lamp comprising:
    an enclosure that is at least partially optically transmissive and a base forming a lamp housing, a gap formed in the lamp housing between the enclosure and the base;
    at least one LED located in the enclosure and operable to emit light when energized through an electrical path from the base;
    a heat sink comprising a heat dissipating portion that is at least partially disposed in the lamp housing and that extends through the gap, the heat dissipating portion comprising a plurality of fins, the plurality of fins extending over the enclosure.

16. A lamp comprising:
    an enclosure;
    a base comprising an electrically conductive connector and an electrically non-conductive housing portion;
    at least one LED located in the enclosure and operable to emit light when energized through an electrical path from the base;
    a heat sink connected to the housing portion comprising a heat dissipating portion having a first part that is located inside of the enclosure and that is thermally coupled to the at least one LED and a second part that is exposed to the ambient environment, the second part extending over the enclosure and the housing portion.

17. The lamp of claim 16 wherein the second part comprises fins.

18. A lamp comprising:
    an enclosure that is at least partially optically transmissive and a base forming a lamp housing, a gap formed in the lamp housing between the enclosure and the base;
    at least one LED located in the enclosure and operable to emit light when energized through an electrical path from the base;
    a heat sink connected to the housing portion comprising a first portion that extends through the gap in the lamp housing and a second portion that extends over the enclosure and the base.

19. The lamp of claim 18 wherein the second part comprises fins.

* * * * *